(12) United States Patent
Ou et al.

(10) Patent No.: US 10,038,782 B2
(45) Date of Patent: Jul. 31, 2018

(54) SYSTEM AND METHOD FOR SUPPORTING MANAGED CALL RECORDING SERVICES

(71) Applicant: Alcatel-Lucent USA Inc., Murray Hill, NJ (US)

(72) Inventors: Simon S. Ou, Murray Hill, NJ (US); Gregory B. Tevonian, Murray Hill, NJ (US); Ram Kuppuswami, Murray Hill, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 4 days.

(21) Appl. No.: 15/090,884

(22) Filed: Apr. 5, 2016

(65) Prior Publication Data
US 2017/0289349 A1    Oct. 5, 2017

(51) Int. Cl.
| | |
|---|---|
| *H04L 12/16* | (2006.01) |
| *H04M 3/42* | (2006.01) |
| *H04L 29/06* | (2006.01) |
| *H04M 3/56* | (2006.01) |
| *H04M 7/12* | (2006.01) |

(52) U.S. Cl.
CPC .... *H04M 3/42221* (2013.01); *H04L 65/1006* (2013.01); *H04L 65/403* (2013.01); *H04M 3/567* (2013.01); *H04M 7/127* (2013.01)

(58) Field of Classification Search
None
See application file for complete search history.

(56) References Cited

U.S. PATENT DOCUMENTS

| | | | | |
|---|---|---|---|---|
| 5,949,871 | A * | 9/1999 | Kabay | H04L 29/06 370/389 |
| 9,258,134 | B2 * | 2/2016 | Portman | H04L 12/1831 |
| 2012/0088475 | A1 * | 4/2012 | Portman | H04L 12/1831 455/412.1 |
| 2014/0270119 | A1 * | 9/2014 | Bischoff | H04M 3/5183 379/88.17 |
| 2017/0251104 | A9 * | 8/2017 | Tamblyn | H04M 3/42221 |

* cited by examiner

*Primary Examiner* — Bob A Phunkulh
(74) *Attorney, Agent, or Firm* — Harness, Dickey & Pierce, P.L.C.

(57) ABSTRACT

The supporting of the managed call recording is used for a call between a calling party and a called party, where a network node receives an invite message that initiates the call, and it is determined that either the calling party or the called party is a managed call recording (MCR) subscriber. A conference bridge is created for the calling party, the called party, and a session initiation protocol recording server (SRS), after the call has been answered by the called party. The network node transmits instructions to play MCR announcements using the conference bridge, prior to the call being connected between the calling party and the called party, where the call is recorded by the SRS.

12 Claims, 17 Drawing Sheets

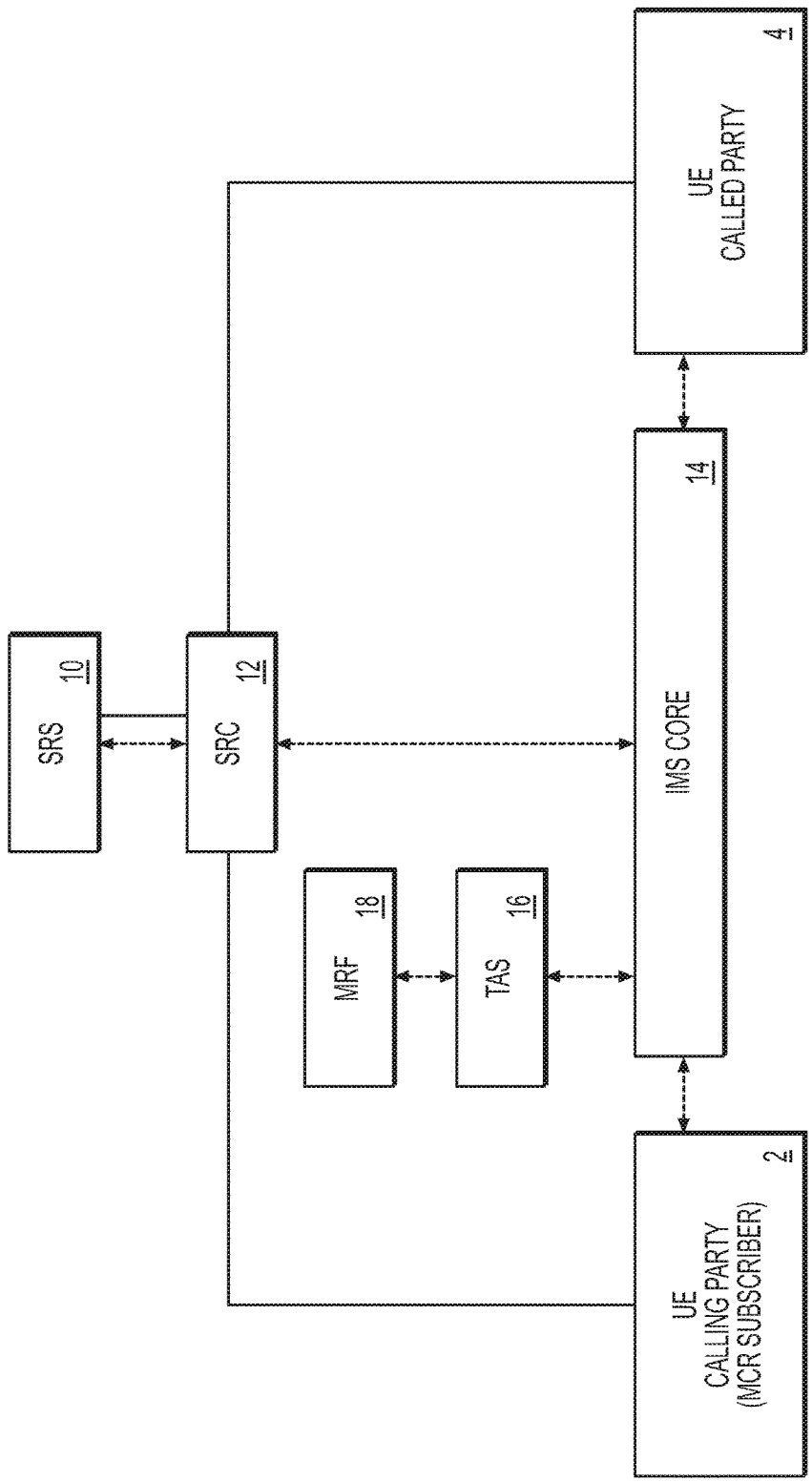
FIG. 1
(CONVENTIONAL)

MCR ORIGINATION

THE TAS 16A SERVING THE CALLING PARTY (UE-2) MAY RECEIVE AN INITIAL INVITE (VIA NETWORK INTERFACE 1630A) AND MAY PROVIDE ORIGINATING CALL PROCESSING SERVICES ASSIGNED TO THE SUBSCRIBER (PROVIDED BY PROCESSOR 1610A, BASED ON SERVICES PROVISIONED IN MEMORY 1620A AND SERVICE MODULE 1622). SINCE THIS CALLING PARTY IS ASSIGNED MCR SERVICE, THE TAS 16A MAY SEND AN INVITE TO SIPREC TAS 16B INSTEAD OF ALLOWING THE INVITE TO CONTINUE TOWARD THE CALLED PARTY (UE-4). THE INVITE SENT TO THE SIPREC TAS 16B MAY INCLUDE A "CTS-TO-SIPREC" TAG IN THE TOP-MOST ROUTE HEADER. THE SIPREC TAS 16B MAY BE THE SAME PHYSICAL ENTITY AS TAS 16A, IN WHICH CASE THE TOP-MOST ROUTE HEADER OF THE INVITE SENT BY TAS 16A MAY POINT BACK TO THE SAME TAS — S100

THE SPIREC TAS 16B MAY RECEIVE AN ORIGINATING INVITE (VIA NETWORK INTERFACE 1630B) WITH A "CTS-TO-SIPREC" TAG IN THE TOP-MOST ROUTE HEADER. BASED ON PROVISIONED DATA IN MEMORY 1620B AND MANAGED CALL MODULE 1624, PROCESSOR 1610B ON SIPREC TAS 16B MAY DETERMINE THAT MCR SERVICE MUST BE PROVIDED. THE INVITE MAY BE ALLOWED TO CONTINUE TOWARD THE CALLED PARTY 4 — S102

WHEN THE SIPREC TAS 16B RECEIVES ANSWER INDICATION FROM THE CALLED PARTY 4, THE SIPREC TAS 16B MAY PERFORM THE FOLLOWING TASKS: — S104

S104.1: CREATE A CONFERENCE BRIDGE BY SENDING AN INVITE TO A CONFERENCE MRF 18A, VIA NETWORK INTERFACE 1630B

S104.2: CONNECT THE CALLED PARTY 4 TO THE CONFERENCE MRF (18A), VIA NETWORK INTERFACE 1630B

S104.3: CONNECT THE SRS 10 TO THE CONFERENCE MRF (18A), VIA NETWORK INTERFACE 1630B AND CALL RECORDING INTERFACE 1640B

S104.4: INSTRUCT THE MRF 18A TO PLAY A CALLED PARTY MCR ANNOUNCEMENT TO THE CALLED PARTY 4

S104.5: INSTRUCT THE MRF 18A TO PLAY A CALLING PARTY MCR ANNOUNCEMENT TO THE CALLING PARTY 2

S104.6: IF NEITHER THE CALLING PARTY 2 NOR THE CALLED PARTY 4 HAVE HUNG UP BEFORE THE ANNOUNCEMENTS COMPLETE, CONNECT THE CALLING PARTY 2 TO THE MRF 18A

S104.7: INSTRUCT THE MRF 18A TO INJECT A BEEP TONE INTO THE CONFERENCE BRIDGE

*FIG. 4*

SYSTEM AND METHOD FOR SUPPORTING MANAGED CALL RECORDING SERVICES

BACKGROUND OF THE INVENTION

Field of the Invention

Example embodiments relate generally to a system and method for supporting managed call recording services in wireless networks that may be shared by multiple entities.

Related Art

Phone systems are gradually migrating toward the use of internet multimedia service (IMS) networks, especially with regard to financial institutions, in order to take advantage of new technologies and provide better customer services. When migrating to IMS networks, entities (such as financial institutions, for instance) must continue to support call recording functions as dictated by the Dodd-Frank Wall Street Reform and Consumer Protection Act. These call recording functions are often referred to as 'managed call recording' (MCR) services. Unlike legacy phone systems (such as a private branch exchange, or PBX) that may often be dedicated to one particular institution to provide local call recording capabilities, an IMS network is typically shared by multiple financial entities and/or consumer users. In addition, an IMS network generally has many diverse network elements that may not be dedicated to a specific entity/institution. IMS networks, and IMS signaling within an IMS network, is governed by request for comment (RFC) 3261, entitled 'SIP: Session Initiation Protocol.'

FIG. 1 illustrates a conventional IMS hierarchy solution for relaying real time protocol (RTP) packets and metadata to a service recording client (SRC) 12 that may replicate the RTP packets to a service recording server (SRS) 12. In order to determine when the SRC 12 should be invoked, an Initial Filter Criteria (IFC) can be provisioned on a 'home subscriber server' (HSS) within an IMS Core 14, where one or more processors of the HSS may perform functions of the IMS Core 14, and these processors of the IMS Core 14 are aware of when to invoke the SRC 12. The IMS core 14 may be a collection of communication servers run by one or more processors. The MCR service may be split into multiple components that are briefly described below.

1. TAS (telephony application server 16): Provides MCR announcements and any telephony services (e.g. call forwarding).

2. IMS Core 14: Invokes SRC 12 if a served party is a MCR subscriber 2.

3. SRC 12: Replicates the RTP packets and delivers data to SRS 10 so that the recoding may be performed.

In a conventional solution, a call origination from a MCR subscriber 2 may generally occur via the following steps. First, the MCR subscriber 2 may send an originating INVITE message to the IMS core 14, and in turn the IMS core 14 may forward the INVITE message to the TAS 16. Then, the TAS 16 may cause a managed recording function (MRF) 18 to play a recording announcement to the MCR subscriber 2. Following the playing of the announcement, the TAS 16 may route the call back to the IMS Core 14. The IMS Core 14 may route the call to the SRC 12. In response, the SRC 12 may route the call to the SRS 10, followed by the SRC 12 routing the call back to the IMS Core 14, whereupon the IMS Core 14 may route the call to the terminating side (i.e., the called party 4). The called party 4 may then answer the call.

Once the call between the parties 2/4 is ongoing, a call termination INVITE message may be transmitted from the IMS Core 14 to the SRC 12 in order to later end the call. To this end, the SRC 20 may perform a call termination INVITE logic with the SRS 10, whereupon the SCR 12 may route the call back to the IMS Core 14. Meanwhile, the call termination INVITE message may be transmitted to the TAS 16, where the TAS 16 may cause the MRF 18 to play a recording announcement to the called party 4. The TAS 16 may also cause the MRF 18 to play a waiting announcement to the calling party 2, if earlier media has been sent to the calling party 2. The termination INVITE message may be sent from the TAS 16 to the IMS Core 14, where the IMS core 14 may in turn send the termination INVITE message to the calling party 4 to end the call.

Based on the discussion of the conventional solution (above), it should be understood that this solution may suffer from some flaws, as listed below:

1. An MCR integration effort involved with this solution may be significant, as too many system components (i.e. TAS 16, MRF 18, Core 14, SRC 12, and SRS 10) are involved in the steps of the solution.

2. A dedicated SRC 12 used to replicate the RTP packets may generally be considered expensive.

3. Normally, IMS RTP transcoding may be performed in the IMS core 14, and it may be difficult (or, not possible) to support transcoding when RTP packets must also be sent through the TAS 16 for announcements or conferencing, or through the SRC 12 for replication.

4. A complicated set of Initial Filter Criteria (IFC) rules is generally required to avoid dropping a recording session when the TAS 16 manipulates the session dialog due to service invocation.

5. The conventional solution may experience 'voice clipping' as the calling and called parties 2/4 may begin speaking before the MCR announcements have been completed.

SUMMARY OF INVENTION

At least one example embodiment relates to a method of supporting managed call recording (MCR) services for a call between a calling party and a called party.

In one embodiment, the method includes receiving, by at least one first processor controlling at least a first network node, an invite message from the calling party, the invite message being a session initiation protocol (SIP) protocol message including a header identifying the called party; identifying, by the at least one first processor, that at least one of the calling party and the called party is a MCR subscriber; creating, by the at least one processor, a conference bridge for the calling party, the called party, and a SIP recording server (SRS) once the call has been answered by the called party, if at least one of the calling party and the called party is a MCR subscriber; transmitting, by the at least one processor, instructions to play MCR announcements using the conference bridge; and connecting, by the at least one processor, the call between the calling party and the called party that is recorded by the SRS.

In one embodiment, the method includes that the creating of the conference bridge includes, modifying the header of the invite message in order to re-direct the invite message to a session initiation protocol recording telephony application server (SIPREC TAS), transmitting a re-invite message to the called party, transmitting a SRS invite message to the SRS, receiving an acceptance message from the called party and the SRS, and transmitting a conference invite message to a conference media resource function (MRF) in order to command the MRF to create the conference bridge.

In one embodiment, the method includes that the creating of the conference bridge further includes, connecting the calling party to the conference MRF, connecting the called party to the conference MRF, and connecting a service recording server (SRS) to the conference MRF.

In one embodiment, the method includes that the transmitting of the instructions to play the MCR announcements includes, if the calling party is the MCR subscriber, transmitting first instructions to the MRF to command the MRF to play a called party MCR announcement for the called party, transmitting second instructions to the MRF to command the MRF to play a calling party MCR announcement for the calling party, if the called party is the MCR subscriber, transmitting third instructions to the MRF to command the MRF to play a calling party MCR announcement for the calling party, transmitting fourth instructions to the MRF to command the MRF to play a called party MCR announcement for the called party.

In one embodiment, the method includes that the connecting of the call between the calling party and the called party includes the following, if the calling party is the MCR subscriber, connecting the calling party to the conference MRF, if neither of the calling party and the called party has disconnected from the conference MRF prior to the respective called party and calling party MCR announcements being played in completion, and injecting a beep tone into the conference bridge prior to connecting the call.

In one embodiment, the method includes that the connecting of the call between the calling party and the called party includes the following, if the called party is the MCR subscriber, connecting the called party to the conference MRF, sending an answer message to the calling party, if neither of the calling party and the called party has disconnected from the conference MRF prior to the respective called party and calling party MCR announcements being played in completion, and injecting a beep tone into the conference bridge prior to connecting the call.

In one embodiment, the method includes that the creating, transmitting, and connecting steps are performed by a session initiation protocol recording telephony application server (SIPREC TAS), the SIPREC TAS being different that the first network node.

At least one embodiment relates to at least one first network node.

In one embodiment, the network node includes at least one first processor configured to, receive an invite message from a calling party, the invite message being a session initiation protocol (SIP) protocol message including a header identifying a called party for a call; identify that at least one of the calling party and the called party is a MCR subscriber; create a conference bridge for the calling party, the called party, and a SIP recording server (SRS) once the call has been answered by the called party, if at least one of the calling party and the called party is a MCR subscriber; transmit instructions to play MCR announcements using the conference bridge; and connect the call between the calling party and the called party that is recorded by the SRS.

In one embodiment, the network node includes that the least one first processor creates the conference bridge by being further configured to, modify the header of the invite message in order to re-direct the invite message to a session initiation protocol recording telephony application server (SIPREC TAS), transmit a re-invite message to the called party, transmit a SRS invite message to the SRS, receive an acceptance message from the called party and the SRS, and transmit a conference invite message to a conference media resource function (MRF) in order to command the MRF to create the conference bridge.

In one embodiment, the network node includes that the at least one first processor creates the conference bridge by being further configured to, connect the calling party to the conference MRF, connect the called party to the conference MRF, and connect a service recording server (SRS) to the conference MRF.

In one embodiment, the network node includes that the at least one first processor transmits the instructions to play the MCR announcements by being further configured to, if the calling party is the MCR subscriber, transmitting first instructions to the MRF to command the MRF to play a called party MCR announcement for the called party, transmitting second instructions to the MRF to command the MRF to play a calling party MCR announcement for the calling party, if the called party is the MCR subscriber, transmitting third instructions to the MRF to command the MRF to play a calling party MCR announcement for the calling party, transmitting fourth instructions to the MRF to command the MRF to play a called party MCR announcement for the called party.

In one embodiment, the network node includes that the at least one first processor connects the call between the calling party and the called party by being further configured to perform the following steps, if the calling party is the MCR subscriber, connect the calling party to the conference MRF, if neither of the calling party and the called party has disconnected from the conference MRF prior to the respective called party and calling party MCR announcements being played in completion, and inject a beep tone into the conference bridge prior to connecting the call.

In one embodiment, the network node includes that the at least one first processor connects the call between the calling party and the called party by being further configured to perform the following steps, if the called party is the MCR subscriber, connect the called party to the conference MRF, send an answer message to the calling party, if neither of the calling party and the called party has disconnected from the conference MRF prior to the respective called party and calling party MCR announcements being played in completion, and inject a beep tone into the conference bridge prior to connecting the call.

In one embodiment, the network node includes that the creating, transmitting, and connecting steps are performed by a session initiation protocol recording telephony application server (SIPREC TAS), the SIPREC TAS being different that the first network node.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 illustrates a conventional IMS hierarchy solution for relaying real time protocol (RTP) packets and metadata to a service recording client (SRC) that may replicate/relay the RTP packets to a service recording server;

FIG. 4 illustrates a procedure for MCR origination between two parties, in accordance with an example embodiment;

DETAILED DESCRIPTION

Figure 2:
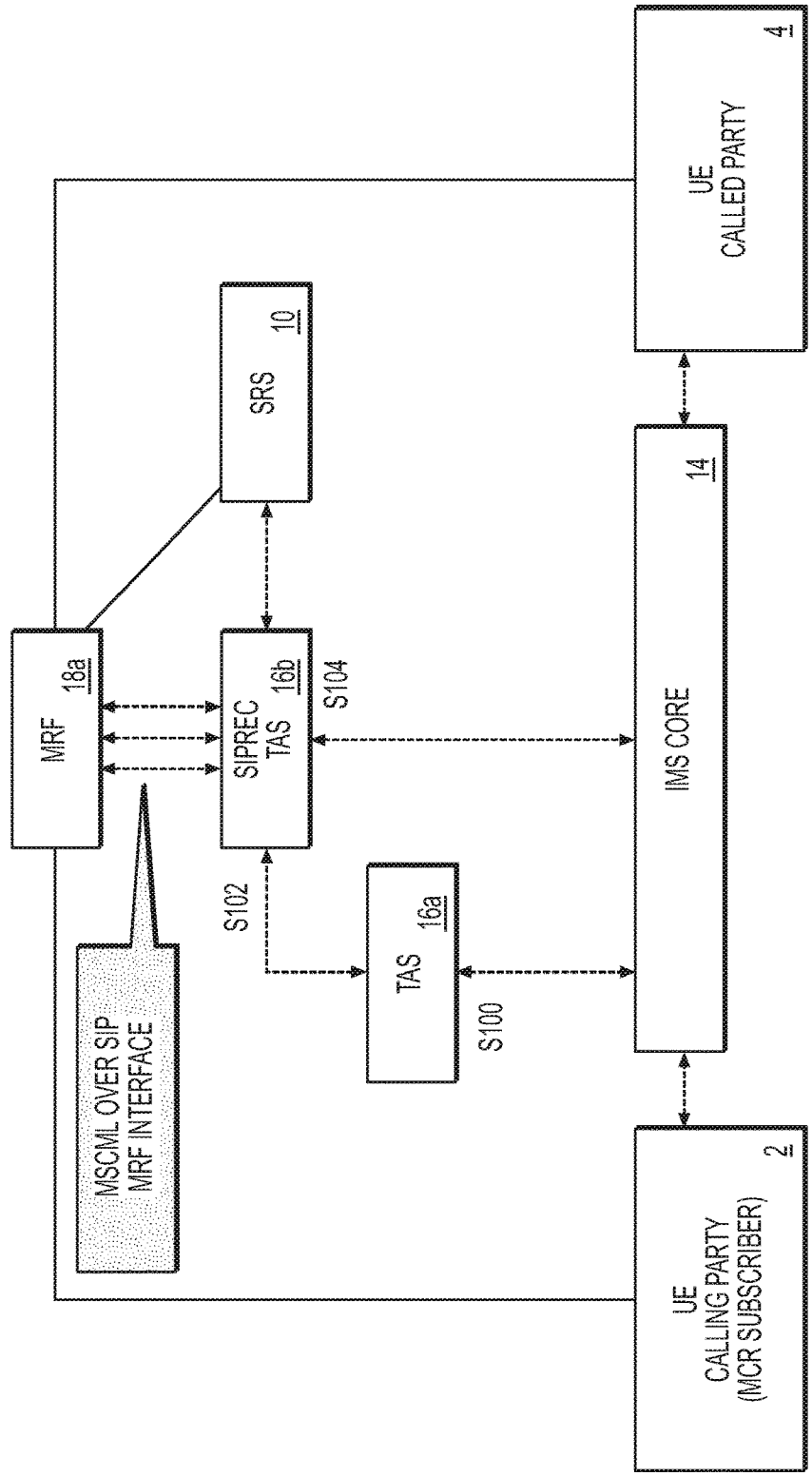
FIG. 2 illustrates a managed call recording (MCR) architecture using a conference model for MCR Origination, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, field programmable gate array (FPGAs), application specific integration circuit (ASICs), the program code or code segments to perform the necessary tasks may be stored in a machine or computer readable medium such as a storage medium, such as a non-transitory storage medium. A processor(s) may perform these necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Basic Methodology:

In an embodiment, a basic purpose of each of the architectures of FIGS. 2 and 10 (described below in detail) is to solve some or all of the conventional issues related to MCR support in an IMS network.

1. Provide a turn-key solution with a minimum integration effort from the perspective of a wireless communication service provider.

2. Provide call recording for a subset of users that are served by the IMS network.

3. Provide a network-based call recording function using an existing IMS element, the media resource function (MRF) 18.

4. Eliminate feature interactions so that the service provider can add new services without impacting the functions of the MRF 18.

5. Provide efficient call processing and signaling procedures to reduce voice clipping when MCR announcements are played to a calling or called party.

6. Position a SIPREC (Session Initiation Protocol Recording) TAS in a network side to ensure that a SIP REC interface will not be dropped when a UE dialog is removed due to service invocation.

7. Utilize standard (conventional) conference procedures, instead of a dedicated method, in order to replicate real time protocol (RTP) packets to the service recording server (SRS) 12.

8. Use a loop back method to isolate standard IMS services and the MCR service to avoid complicated service interactions.

9. Provide an indication that the calling and called parties can start to talk to avoid voice clipping.

10. Support MCR announcement optimization.

Architecture Embodiments

FIG. 2 illustrates a MCR architecture 102 for a phone call between two parties 2/4, in accordance with an example embodiment, where MCR services may be assigned to the calling party 2. A modified TAS 16*a* is to perform basic call processing services (e.g. calling restrictions, conference call, etc.). Specifically, the TAS 16*a* has been modified to interface with the SIPREC TAS 16*b*. The SIPREC TAS 16*b* may perform the MCR functions and provide an interface to the SRS 10. A modified MRF 18*a* may provide a RTP interface to the SRS 10, using a conference method. The SRS 10 may provide standard SIPREC SRS functions.

Figure 3A:
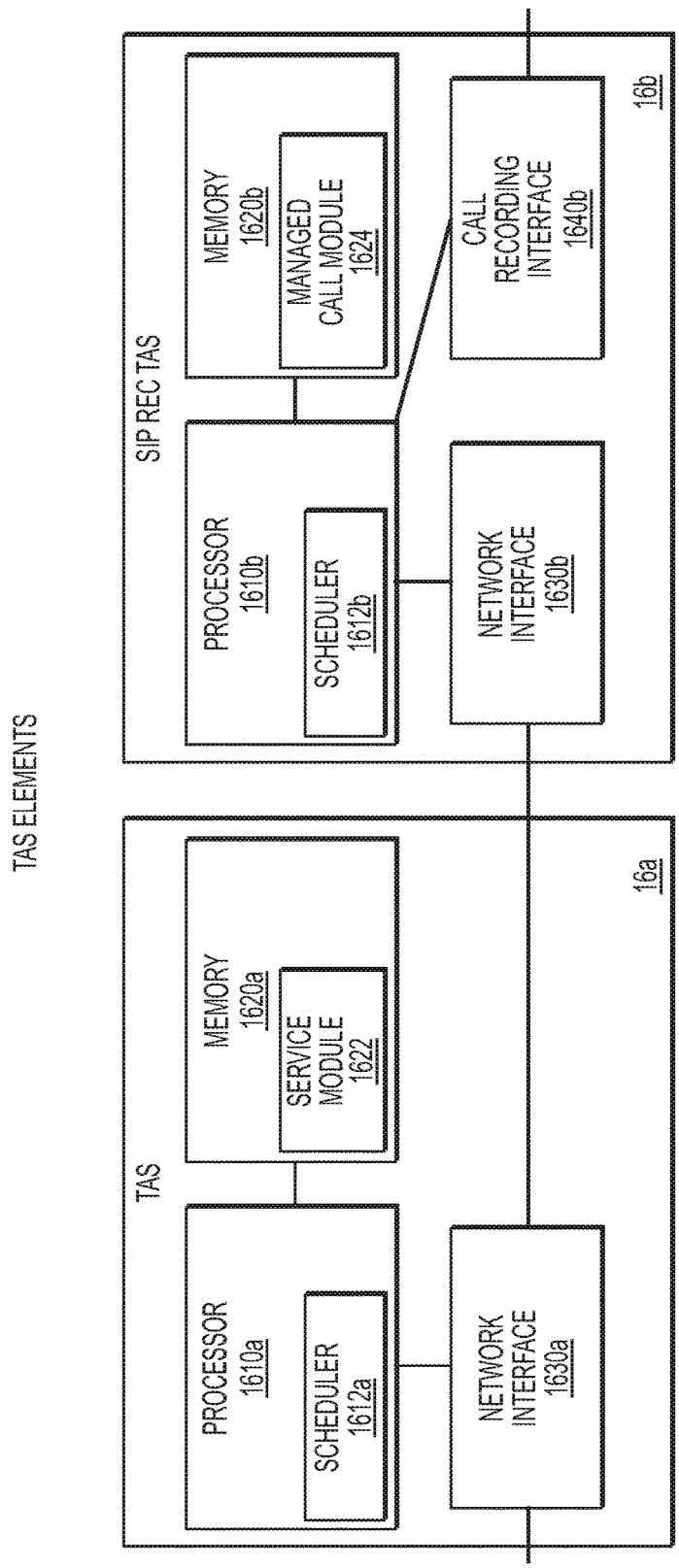
FIG. 3A illustrates a modified telephony application server (TAS) in communication with a Session Initiation Protocol Recording (SIPREC) TAS, in accordance with an example embodiment.

FIG. 3A illustrates a modified TAS 16*a* in communication with a SIPREC TAS 16*b*, in accordance with an example embodiment. The TAS 16*a* may include a memory 1620*a*, a network interface 1630*a*, and a processor 1610*a*. The memory 1620*a* may save information and data communications that is received from other entities, and the memory 1620*a* may also save information and data communications that the TAS 16*a* is to send to other entities, in accordance with methods described herein. The memory 1620*a* may also include a service module (SM) 1622, where the SM 1622 may include a set of instructions which the processor 1610*a* may use to perform the method steps described in association with FIGS. 4 and 11. The processor 1610*a* may include a scheduler 1612*a* that schedules the data communications to perform the method steps.

The SIPREC TAS 16*b* may be in communication with the TAS 16*a* via the network interfaces 1630*a/b*. The SIPREC TAS 16*b* may include a memory 1620*b*, a Call Recording Interface 1640*b*, and a processor 1610*b*. The processor 1610*b* may include a scheduler 1612*b* that saves information and data communication being transmitted and received by the SIPREC TAS 16*b*. The memory 1620*b* may include a managed call module (MCM) 1624 that includes a set of instructions which the processor 1610*b* may use to perform the method steps described in association with FIGS. 4 and 11.

Figure 3B:
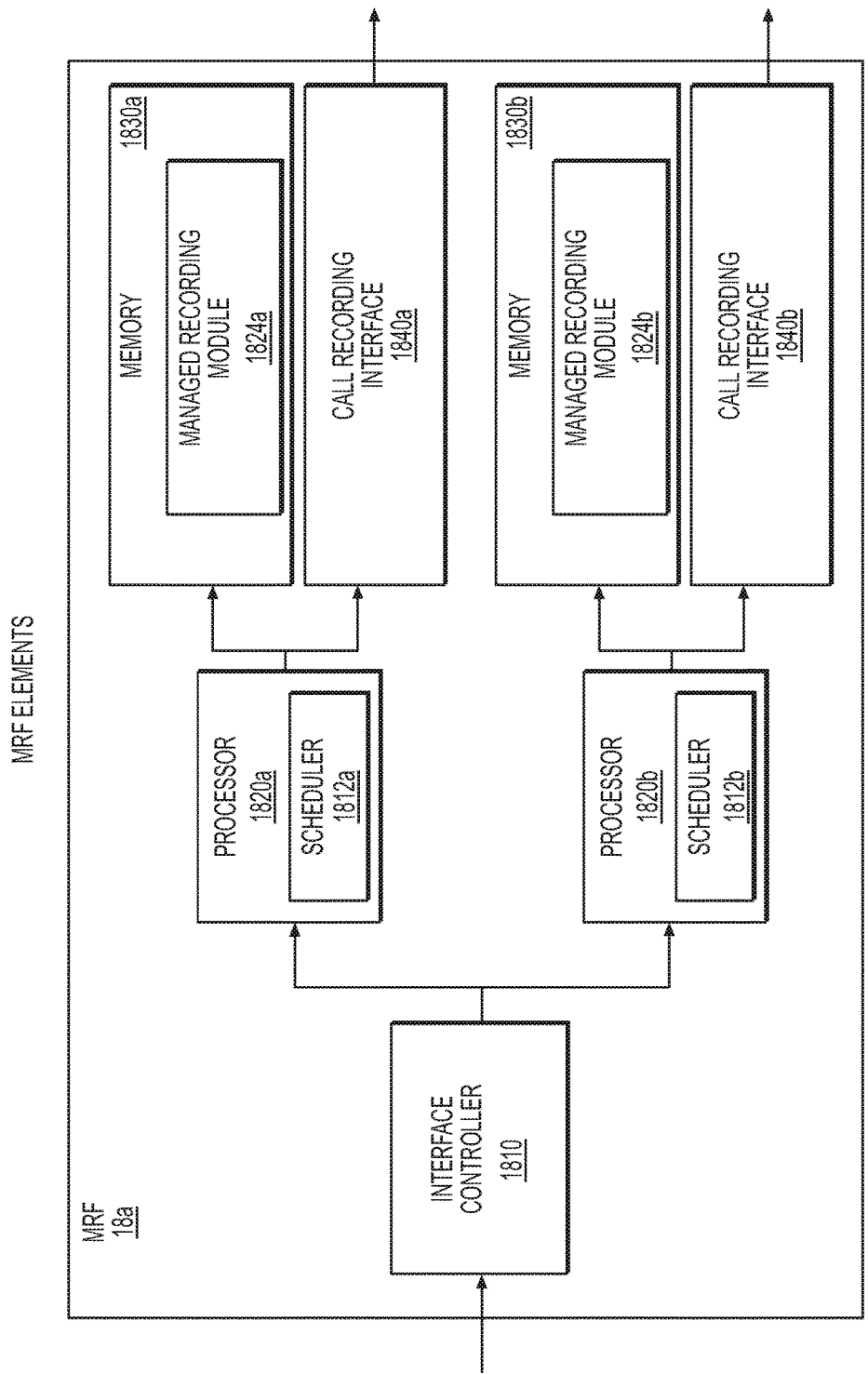
FIG. 3B illustrates a modified media resource function (MRF), in accordance with an example embodiment.
Figure 5:
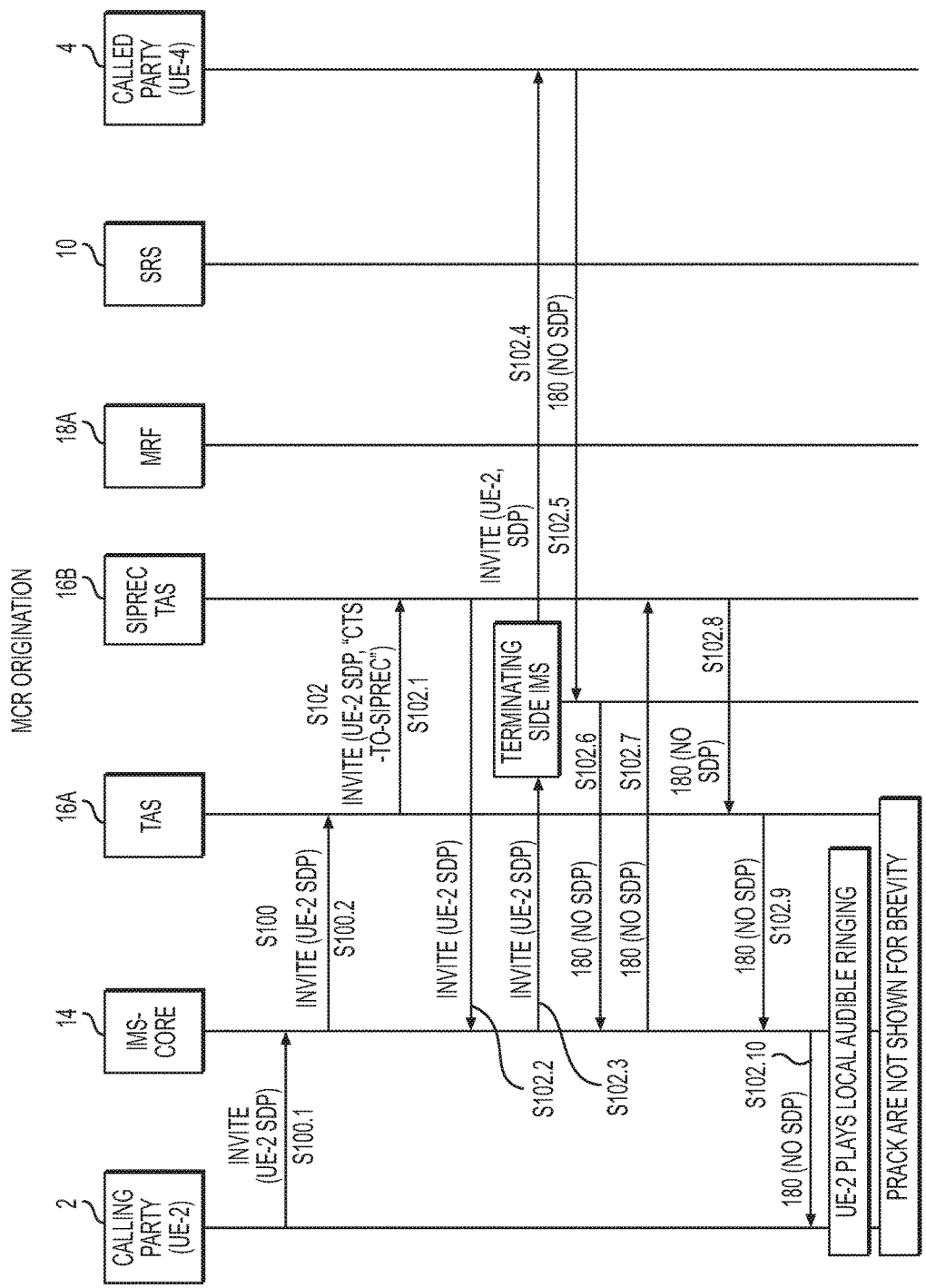
FIG. 5 illustrates a portion of a communication diagram for the MCR origination between the two parties, in accordance with an example embodiment.
Figure 6:
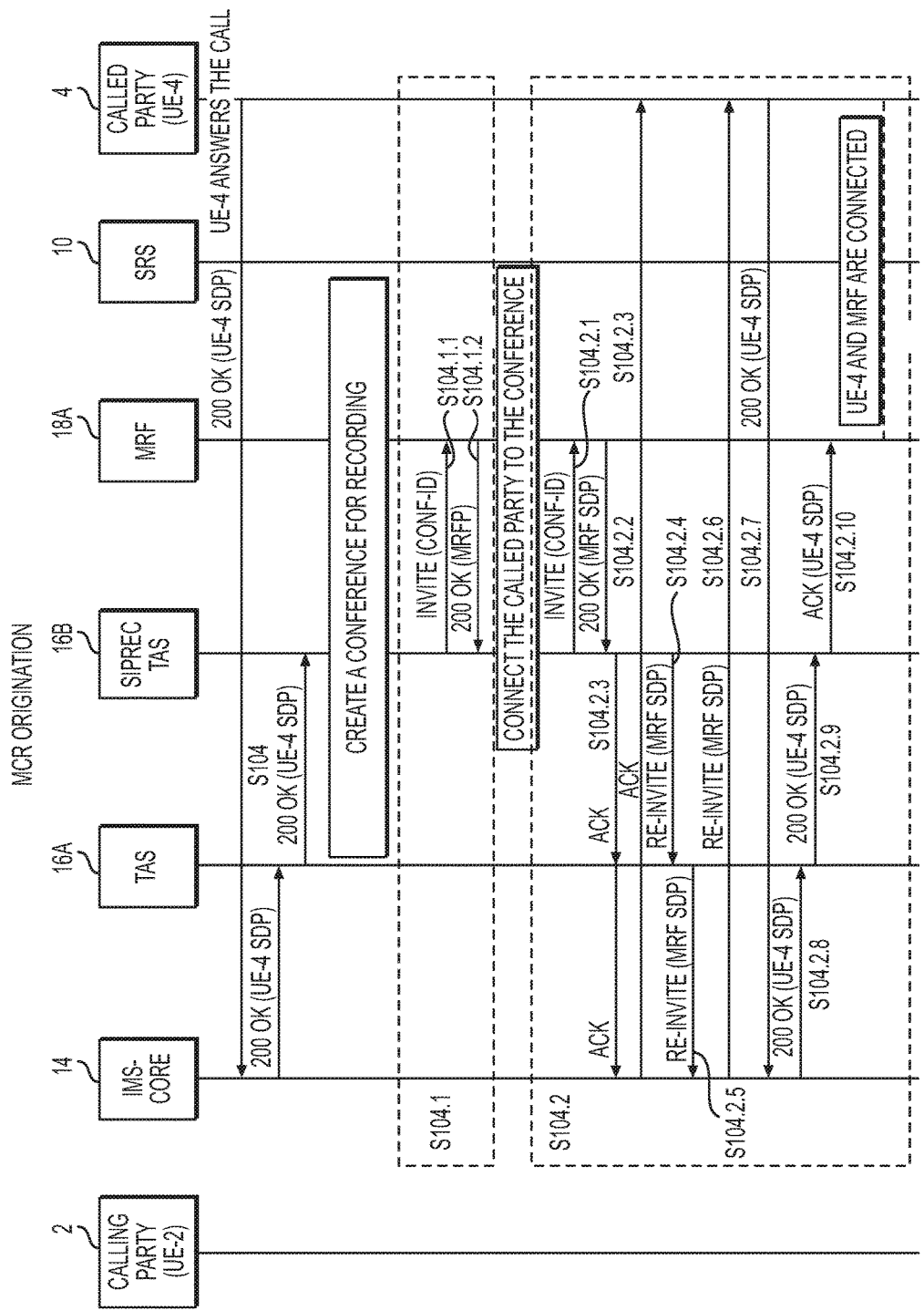
FIG. 6 illustrates another portion of a communication diagram for the MCR origination between the two parties, in accordance with an example embodiment.
Figure 7:
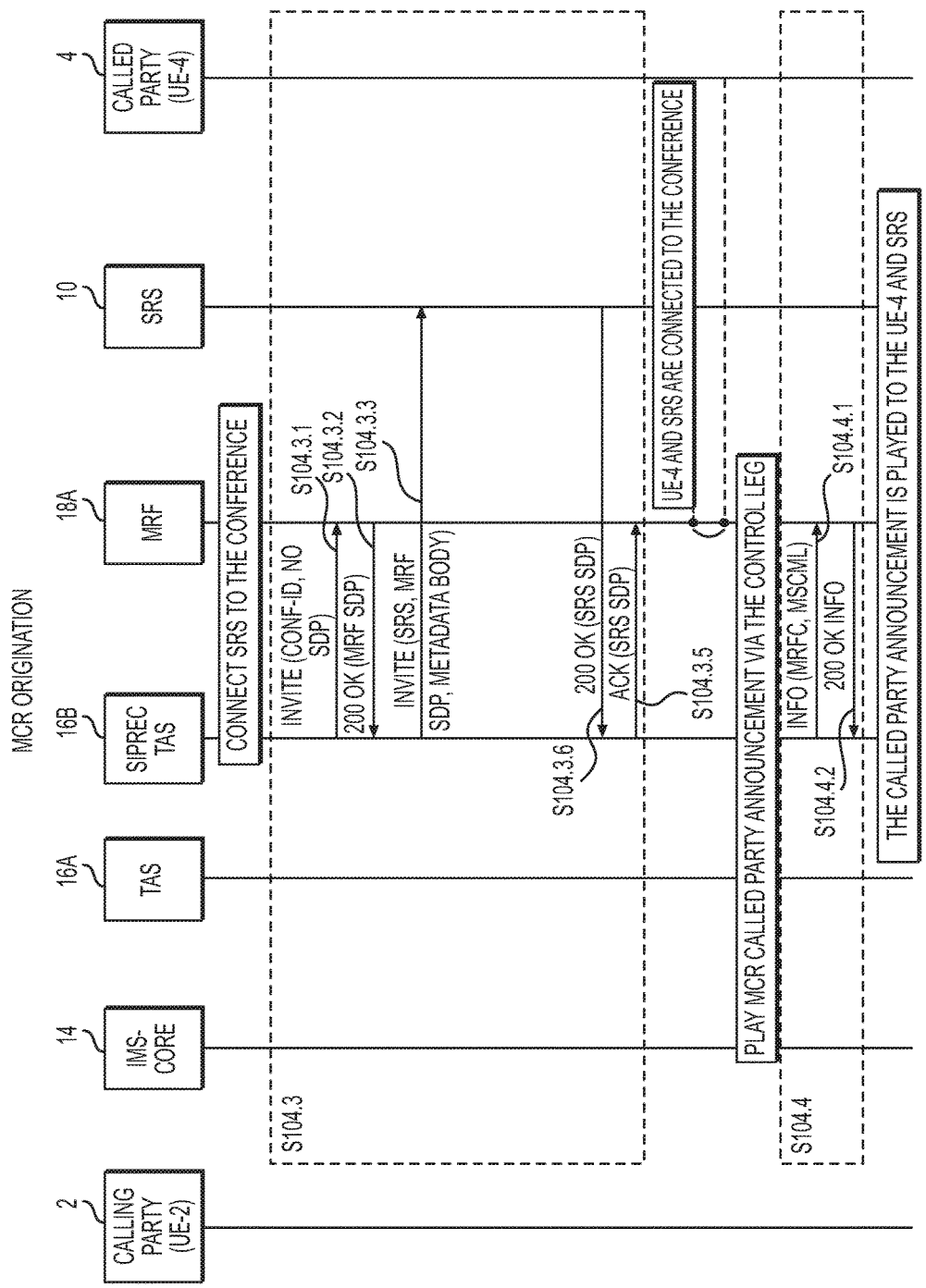
FIG. 7 illustrates another portion of a communication diagram for the MCR origination between the two parties, in accordance with an example embodiment.
Figure 8:
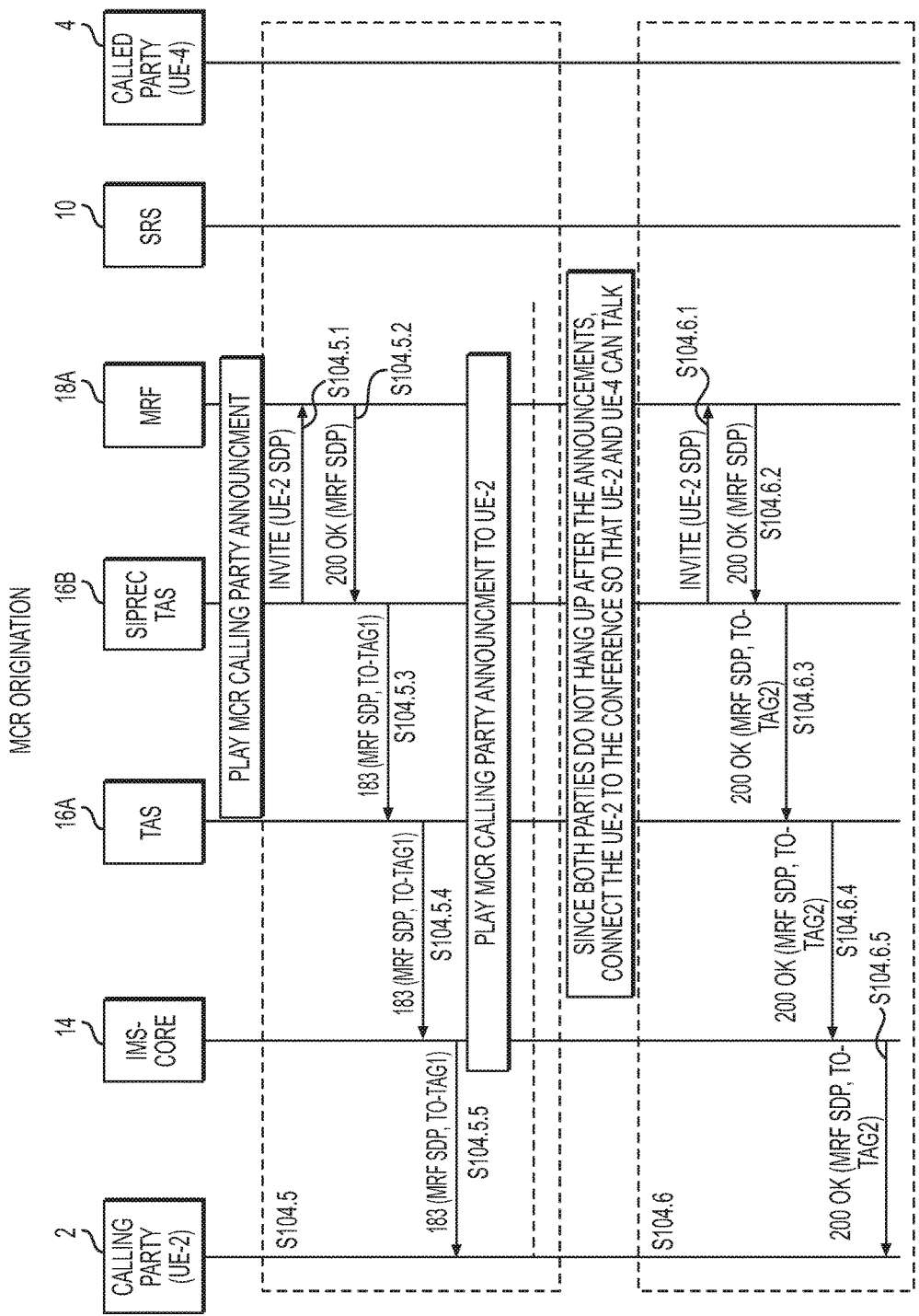
FIG. 8 illustrates another portion of a communication diagram for the MCR origination between the two parties, in accordance with an example embodiment.
Figure 9:
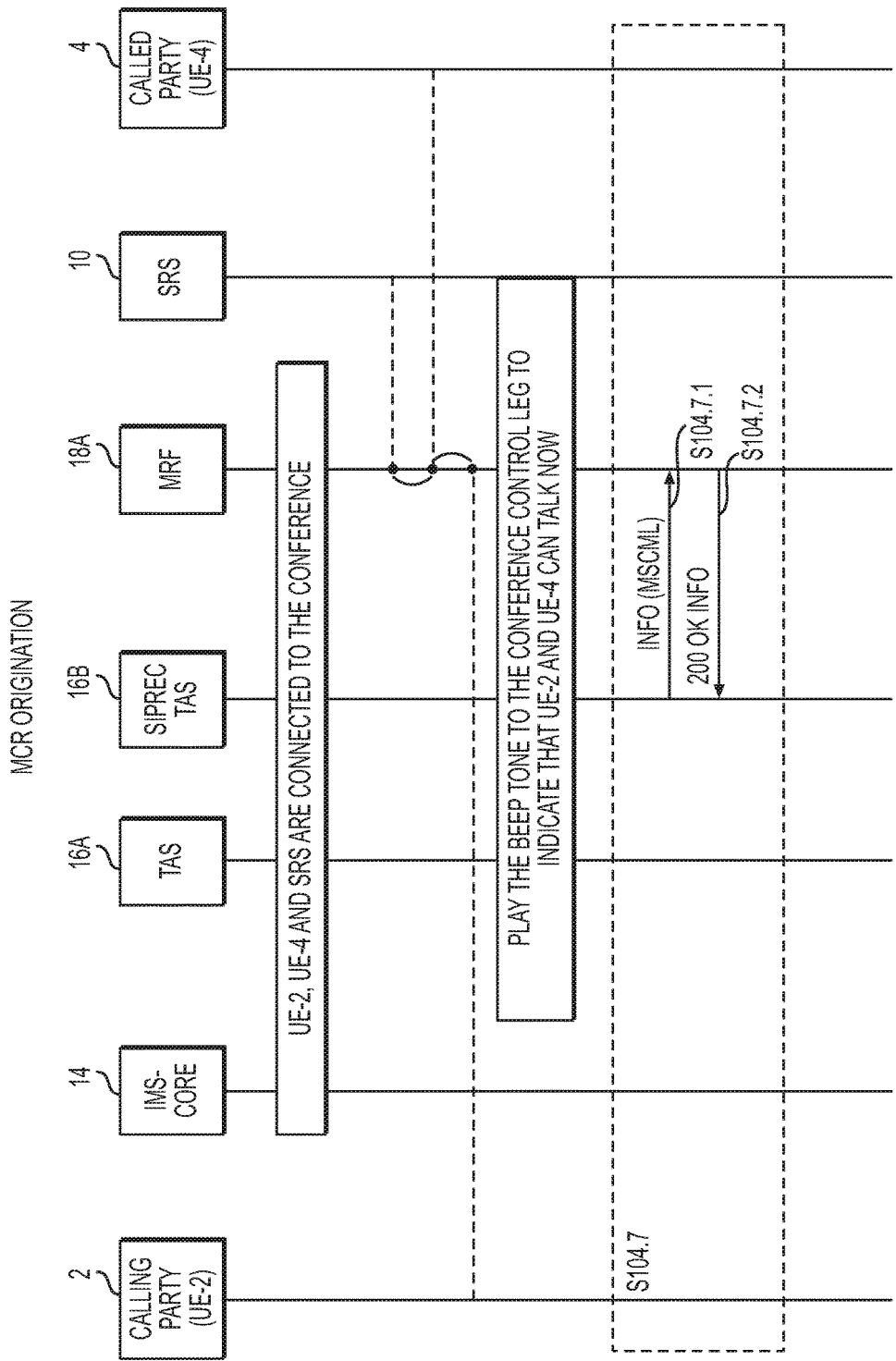
FIG. 9 illustrates another portion of a communication diagram for the MCR origination between the two parties, in accordance with an example embodiment.

FIG. 3B illustrates a modified Media Resource Function (MRF) 18*a*, in accordance with an example embodiment. The MRF 18*a* may include an interface controller 1810 that receives information and data communications for the MRF 18*a*. The interface controller 1810 may be in communication with one or more processors 1820*a/b* that perform the functions of the MRF 18*a* (two processors are shown here, just as an example). Each processor 1820*a/b* may include a respective scheduler 1812*a/b* that schedules information and data communication exchanges with other entities. Each of the processors 1820a/b may interface with a respective memory 1830a/b, where the memory 1830a/b may include a managed recording module 1824a/b that includes a set of instructions. The set of instructions may be performed by the one or more processors 1820a/b, in order to perform the method steps that are associated with the methods described in FIGS. 4 and 11. The MRF 18a may include one or more call recording interfaces 1840a/b that transmit information and data from the MRF 18a, in accordance with the method steps described herein.

FIG. 4 illustrates a method flowchart detailing procedures for MCR service on a call between two parties (user equipment UE 2 and UE 4), where the MCR service may be assigned to the calling party 2, in accordance with an example embodiment. A discussion of these method steps is described in relation to the communication diagrams of FIGS. 5-9 (described in detail below). Specifically, FIGS. 5-9 illustrate a communication diagram for MCR a call between the two parties (the MCR subscriber, or calling party UE 2, and the called party UE 4), in accordance with an example embodiment. A discussion of the communication diagram (below) is accompanied by a related discussion of the hierarchy of FIG. 2 and the method flowchart of FIG. 4.

In step S100 of FIG. 4, the TAS 16a serving UE 2 receives an initial INVITE (via Network Interface 1630A). The INVITE may be a session initiation protocol (SIP) protocol message. The receipt of the INVITE is depicted in steps S100.1 and S100.2 of FIG. 5, where the INVITE may be transmitted from the UE 2 through the IMS core 14 to the TAS 16a. The processor 1610a of the TAS 16a may then provide originating call process services (i.e., MCR services) that may be assigned to the subscriber (UE 2). Since UE 2 (the calling party) may be assigned MCR service, the processor 1610a may cause the TAS 16a to send an INVITE to the SIPREC TAS 16b via Network Interface 1630A, instead of allowing the INVITE to continue toward UE 4 (the called party 4). Specifically, the INVITE sent to the SIPREC TAS 16b may be modified by the processor 1610b to include a "cts-to-siprec" tag in the top-most Route header. The SIPREC TAS 16b may be the same physical entity as the TAS 16a. In such a scenario, the top-most Route header of the INVITE sent by the TAS 16a may point back to the same TAS 16a (i.e., the processor 1610a may cause the INVITE to, in essence, be sent back to itself).

In step S102 of FIG. 4, the SIPREC TAS 16b may receive an originating invite (via Network Interface 1630b) with a "cts-to-siprec" tag in the top-most Route header. The processor 1610b of SIPREC TAS 16b may then determine that MCR services are to be provided, based on the service plan of the UE 2. These steps are depicted in the communication exchange of steps S102.2, S102.3, and S102.4 of FIG. 5, where the processor 1610b may cause the SIPREC TAS 16b to send an INVITE from the SIPREC TAS 16b through the IMS core 14 toward the called party 4 (UE 4). Steps S102.5, S102.6, S102.7, S102.8, S102.9, and S102.10 show standard ringing indication that may be sent from the UE 4 to the UE2.

In step S104 of FIG. 4, the SIPREC TAS 16b may receive an answer indication from UE 4 (via Network Interface 1630b), whereupon the processor 1610b of the SIPREC TAS 16b may perform a number of tasks, described below.

In step S104.1, the processor 1610b may cause the SIPREC TAS 16b to create a conference bridge by sending an invite for a conference to MRF 18a. This information exchange is depicted in step S104.1.1 of FIG. 6, where the processor 1610b may cause the SIPREC TAS 16b to send an INVITE to the MRF 18a, and in step S104.1.2, the SIPREC TAS 16b may receive a 200 OK response (an acceptance response) from the MRF 18a indicating that the conference has been successfully created.

In step S104.2, the processor 1610b may cause the SIPREC TAS 16b to connect the UE 4 to the conference MRF 18a. This information exchange is depicted in step S104.2.1 of FIG. 6, where the processor 1610b of the SIPREC TAS 16b may send an INVITE to the MRF 18a to allocate a port on the conference bridge, and in step S104.2.2 the MRF 18a may send a 200 OK response (an acceptance response) with an SDP offer. In step S104.2.3, an ACK message may be sent from the processor 1610b of the SIPREC TAS 16b to the UE 4 to confirm that the call has been answered. And, in steps S104.2.4, S104.2.5, and S104.2.6 the processor 1610b may cause the SIPREC TAS 16b to send a REINVITE through the IMS Core 14 to the UE 4 with the SDP offer received from the MRF 18a (from step S104.2.2). In steps S104.2.7, S104.2.8, and S104.2.9 the 200 OK response with SDP answer from the UE 4 may be sent to the SIPREC TAS 16b. And, in step S104.2.10, the processor 1610b may cause the SIPREC TAS 16b to send an ACK with SDP answer to the MRF 18a. At the conclusion of step S104.2.10, a media path may be established between the MRF 18a and the UE 4.

In step S104.3, the processor 1610b may cause the SIPREC TAS 16b to connect the SRS 10 to the conference MRF 18a. This exchange of information is depicted in step S104.3.1 of FIG. 7, where the processor 1610b may cause the SIPREC TAS 16b to send an INVITE to the MRF 18a to allocate a port on the conference bridge, and in step S104.3.2 the MRF 18a may send a 200 OK response (an acceptance response) with an SDP offer. In step S104.3.3, the processor 1610b may cause the SIPREC TAS 16b to send an INVITE (i.e., a SRS INVITE) with the SDP offer to the SRS 10. In step S104.3.4, the SRS 10 may send a 200 OK response with SDP answer to the SIPREC TAS 16b. In step S104.3.5, the processor 1610b may cause the SIPREC TAS 16b to send an ACK with SDP answer to the MRF 18a. At the conclusion of step S104.3.5, a media path may be established between the MRF 18a and the SRS 10.

In step S104.4, the processor 1610b may cause the SIPREC TAS 16b to instruct the MRF 18a to play a called party MCR announcement for the UE 4. In step S104.4.1 of FIG. 7, the processor 1610b may cause the SIPREC TAS 16b to send an INFO request to the MRF 18a. The INFO may include a request to play an MCR announcement on the conference bridge, so that the UE 4 hears the announcement.

In step S104.5, the processor 1610b may cause the SIPREC TAS 16b to instruct the MRF 16a to play a calling party MCR announcement for the UE 2. This information exchange is depicted in step S104.5.1 of FIG. 8, where the processor 1610b may cause the SIPREC TAS 16b to send an INVITE to the MRF 18a. The INVITE carries an instruction to play an MCR announcement to the UE 2. In step S104.5.2, the MRF 18a may send a 200 OK response (an acceptance response) with the SDP answer to the SIPREC TAS 16b. In step S104.5.3 a 183 Session Progress message may be sent from the SIPREC TAS 16b to the TAS 16a. In steps S104.5.4 and S104.5.5, a 183 Session Progress message may be sent from the TAS 16a through the IMS Core 14 to the UE 2. The UE 2 may now hear the MCR announcement provided by the MRF 18a.

In step S104.6, the processor 1610b may cause the SIPREC TAS 16b to determine if either the UE 2 or the UE 4 has disconnected the call prior to the announcement being played in completion, and if the call has not been disconnected on either end then the processor 1610b connects the UE 2 to the MRF 18a. This information exchange is depicted in step S104.6.1 of FIG. 8, where the processor 1610b may cause the SIPREC TAS 16b to send an INVITE to the MRF 18a to allocate a port on the conference bridge, and in step S104.6.2 the MRF 18a may send a 200 OK response (an acceptance response) with an SDP offer. In step S104.6.3 the processor 1610b may cause the SIPREC TAS 16b to send a 200 OK INVITE response to the TAS 16a, and in steps S104.6.4 and S104.6.5 the 200 OK response may be sent through the IMS core 14 to the UE 2. At the conclusion of step S104.6.5, a media path may be established between the MRF 18a and the UE 2, such that the UE 2, the UE 4, and the SRS 10 may all be connected to the same conference bridge on the MRF 18a.

In step S104.7, the processor 1610b may cause the SIPREC TAS 16b to instruct the MRF 18a to inject a beep tone into the conference bridge. This information exchange is depicted by step S104.7.1 of FIG. 9, where the processor 1610b may cause the SIPREC TAS 16b to send an INFO request to the MRF 18a. The INFO may include a request to inject a beep tone into the conference, so that the UE 2 and the UE 4 may understand that the call has been fully established. In step S104.7.2, the MRF 18a may send a 200 OK response (an accept response) to the SIPREC TAS 18b. Then, the UE 2 and the UE 4 may begin two-way communication that may be recorded by the SRS 10.

Figure 10:
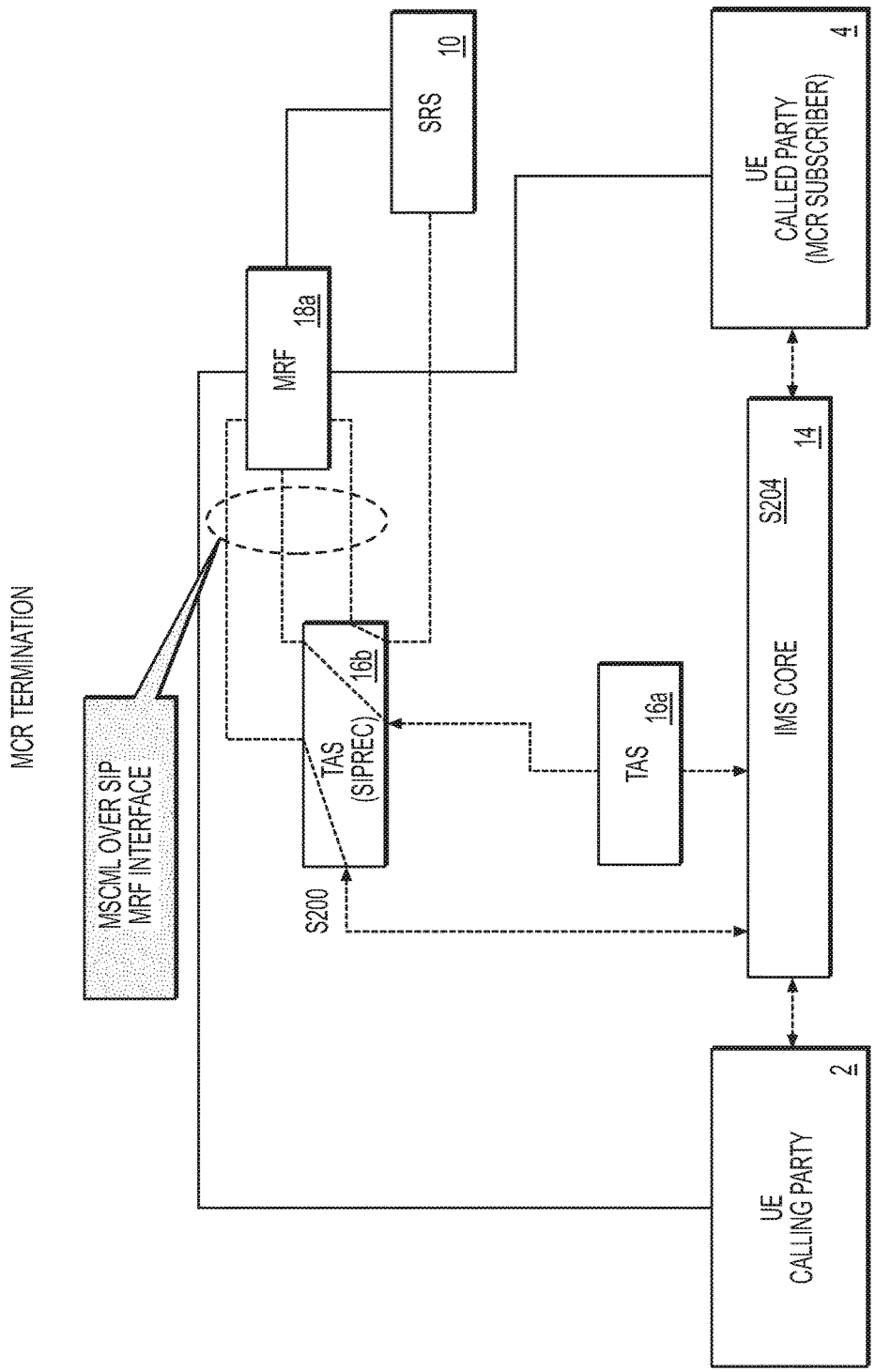
FIG. 10 illustrates a MCR architecture for terminating a phone call between two parties, in accordance with an example embodiment.

FIG. 10 illustrates a MCR architecture 202 for a phone call between two parties 2/4, in accordance with an example embodiment, where MCR service may be assigned to the called party 4. A modified TAS 16a may perform basic call processing services (e.g. call forwarding, conference call, etc.). Specifically, the TAS 16a (controlled by processor 1610a) may be modified to interface with the SIPREC TAS 16b (controlled by processor 1610b). The processor 1610b may cause the SIPREC TAS 16b to perform the MCR functions and provide an interface to the SRS 10. A modified MRF 18a may provide a RTP interface to the SRS 10, using a conference method. The SRS 10 may provide standard SIPREC SRS functions.

Figure 11:
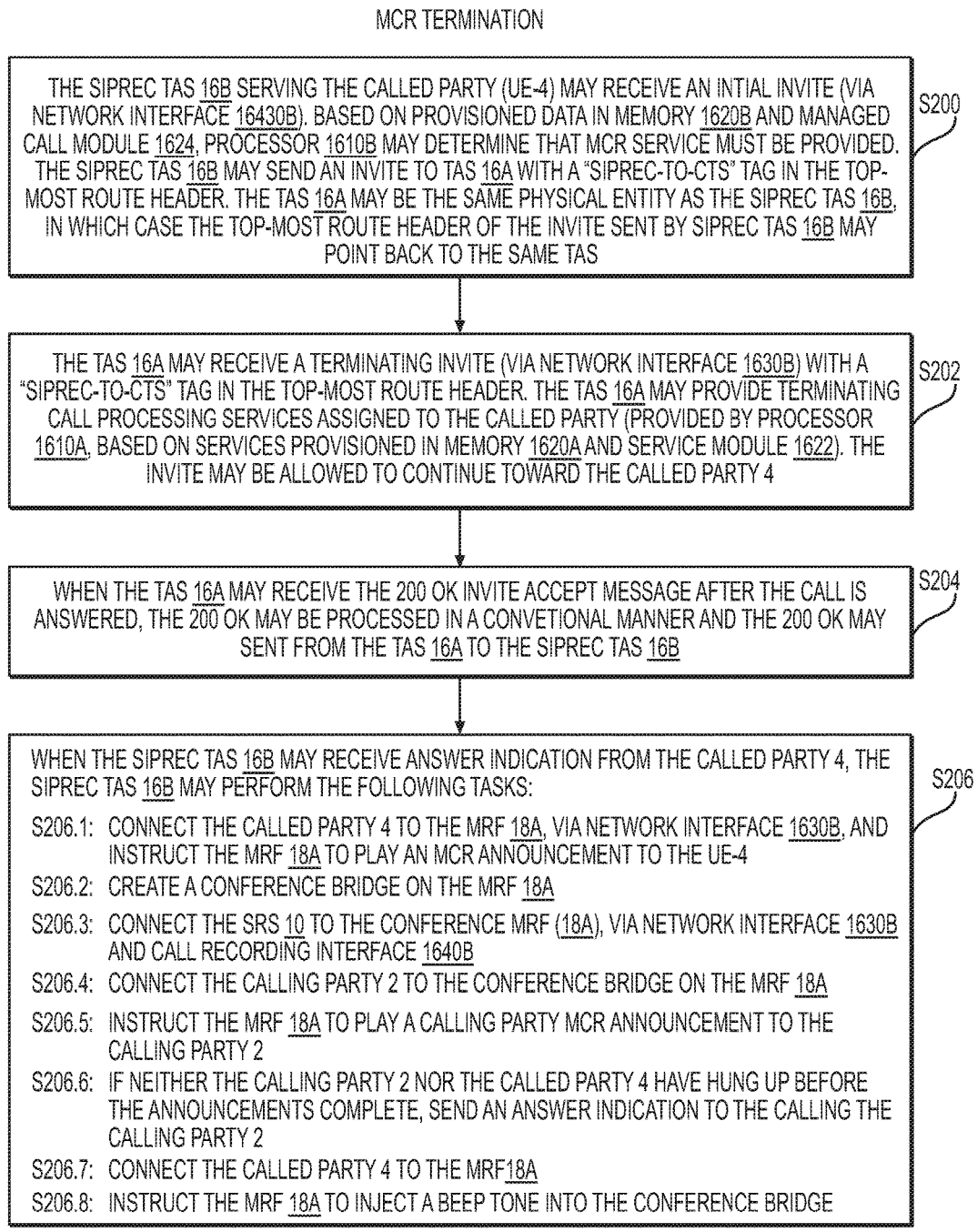
FIG. 11 illustrates a procedure for MCR origination between two parties, in accordance with an example embodiment.
Figure 12:
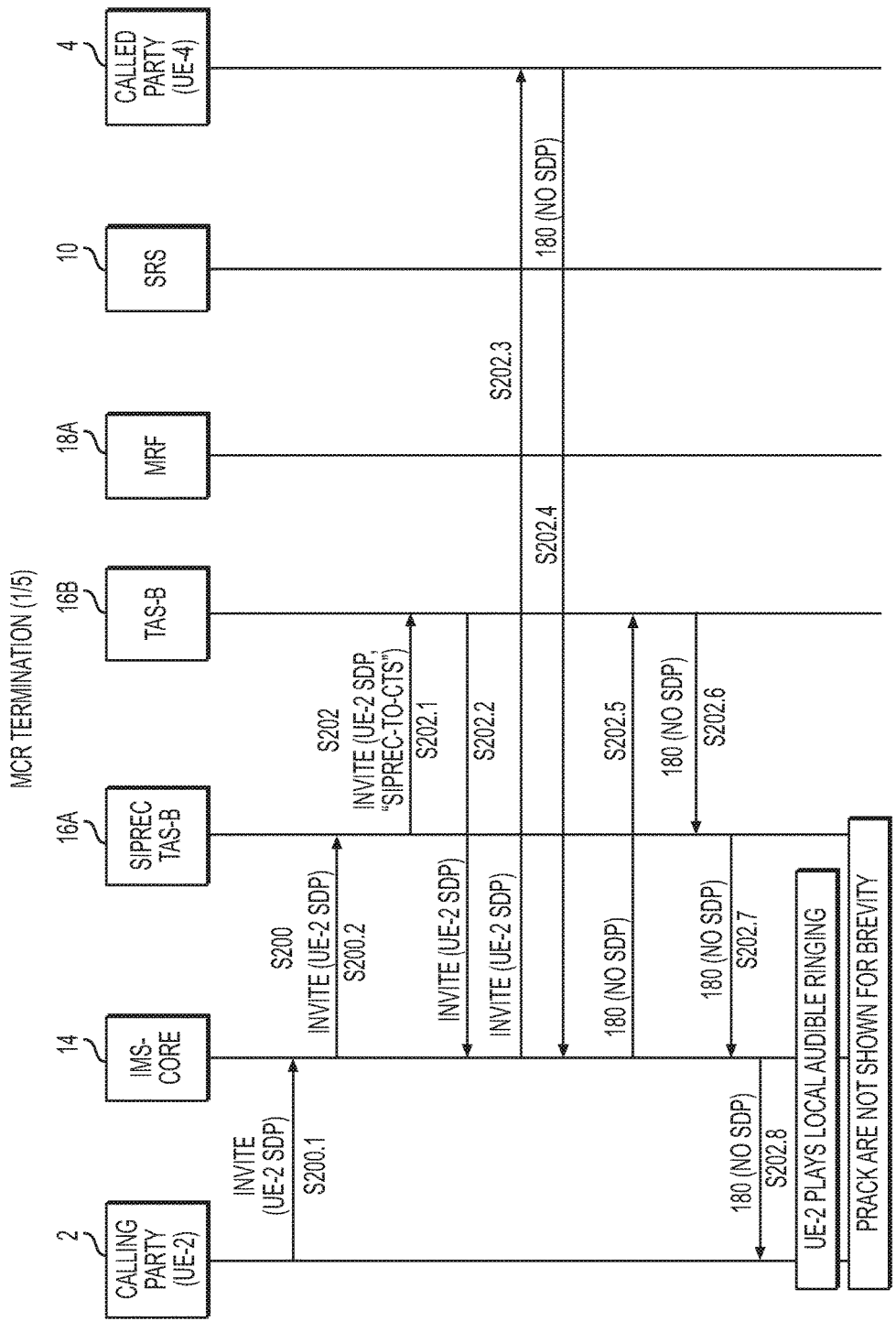
FIG. 12 illustrates a portion of a communication diagram for the MCR termination between two parties, in accordance with an example embodiment.

FIG. 11 illustrates a method flowchart detailing procedures for MCR service on a call between two parties (user equipments UE 2 and UE 4) when the MCR service may be assigned to the called party 4, in accordance with an example embodiment. A discussion of these method steps is described in relation to the communication diagrams of FIGS. 12-16 (described in detail, below). FIGS. 12-16 illustrate a communication diagram for an MCR call between the two parties (the calling party UE 2, and the MCR subscriber, or called party UE 4), in accordance with an example embodiment. A discussion of the communication diagram (below) is accompanied by a related discussion of the hierarchy of FIG. 10 and the method flowchart of FIG. 11.

In step S200 of FIG. 11, the SIP REC TAS 16b serving UE 4 may receive an initial INVITE (via Network Interface 1630b). The receipt of the INVITE is depicted in steps S200.1 and S200.2 of FIG. 12, where the INVITE may be transmitted from UE 2 through the IMS core 14 to the SIPREC TAS 16b. The processor 1610b of SIPREC TAS 16b may then determine that MCR service is to be provided, based on the service plan of the UE 4. In step S202.1 of FIG. 12, the processor 1610b may cause the SIPREC TAS 16b to send the INVITE directly to the TAS 16b. Specifically, the INVITE sent from the SIPREC TAS 16b to the TAS 16a may be modified by the processor 1610b to include a "siprec-to-cts" tag in the top-most Route header. The TAS 16a may be the same physical entity as the SIPREC TAS 16b, in which case the top-most Route header of the INVITE sent by the SIPREC TAS 16b may point back to the same SIPREC TAS 16b (i.e., the processor 1610b may cause the INVITE to, in essence, be sent back to itself).

In step S202 of FIG. 11, the TAS 16a may receive a terminating invite (via Network Interface 1630a) with a "siprec-to-cts" tag in the top-most Route header. The processor 1610a of TAS 16a may then provide terminating call processing services (such as incoming call barring), based on the service plan of the UE 4. In steps S202.2 and S202.3 of FIG. 12, the INVITE from the TAS 16a may be routed through the IMS core 14 toward the called party 4 (i.e., the MCR subscriber). Steps S202.4, S202.5, S202.6, S202.7, and S202.8 show standard ringing indication that may be from the UE 4 to the UE2.

Figure 13:
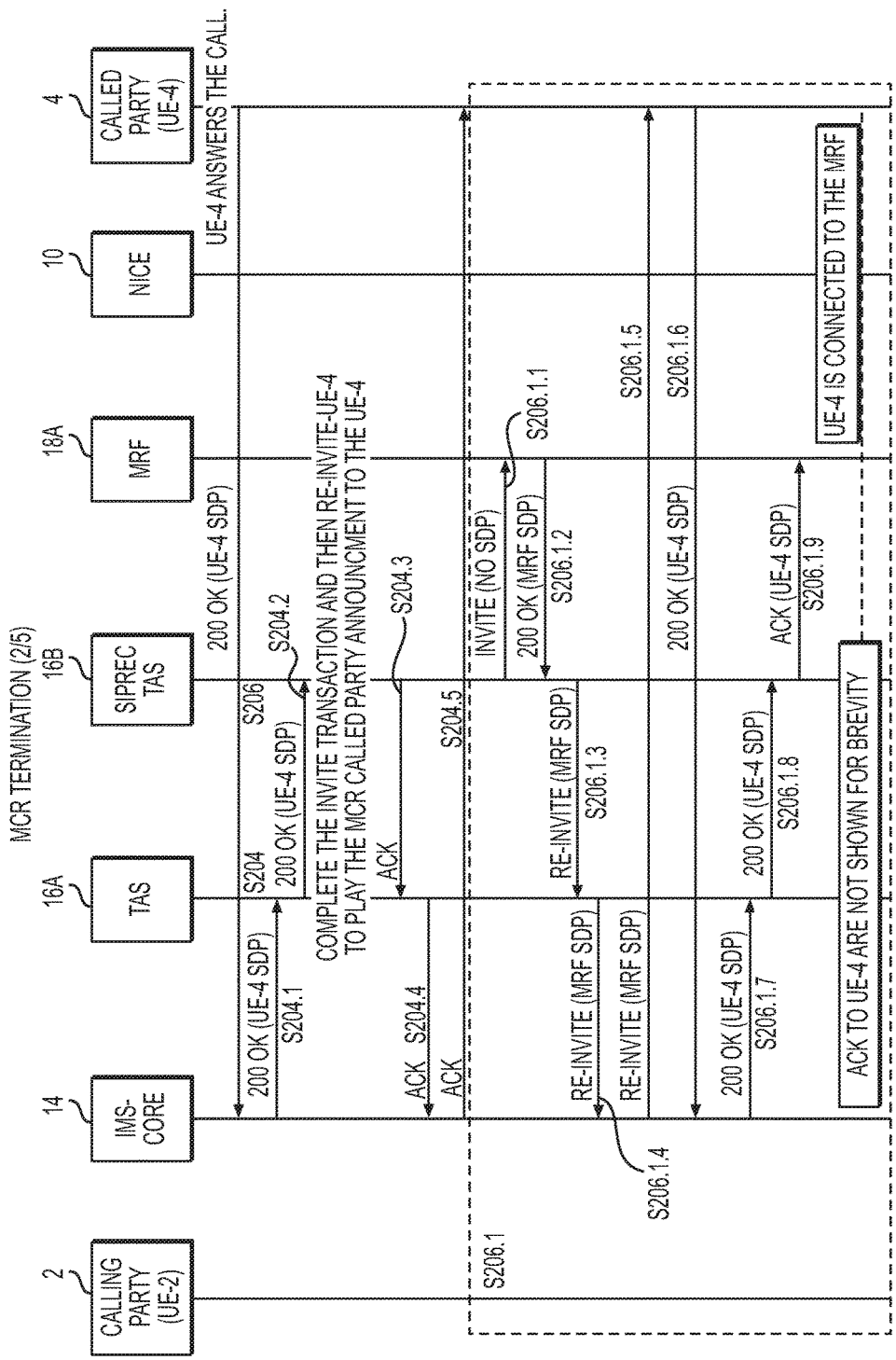
FIG. 13 illustrates another portion of a communication diagram for the MCR termination between the two parties, in accordance with an example embodiment.
Figure 14:
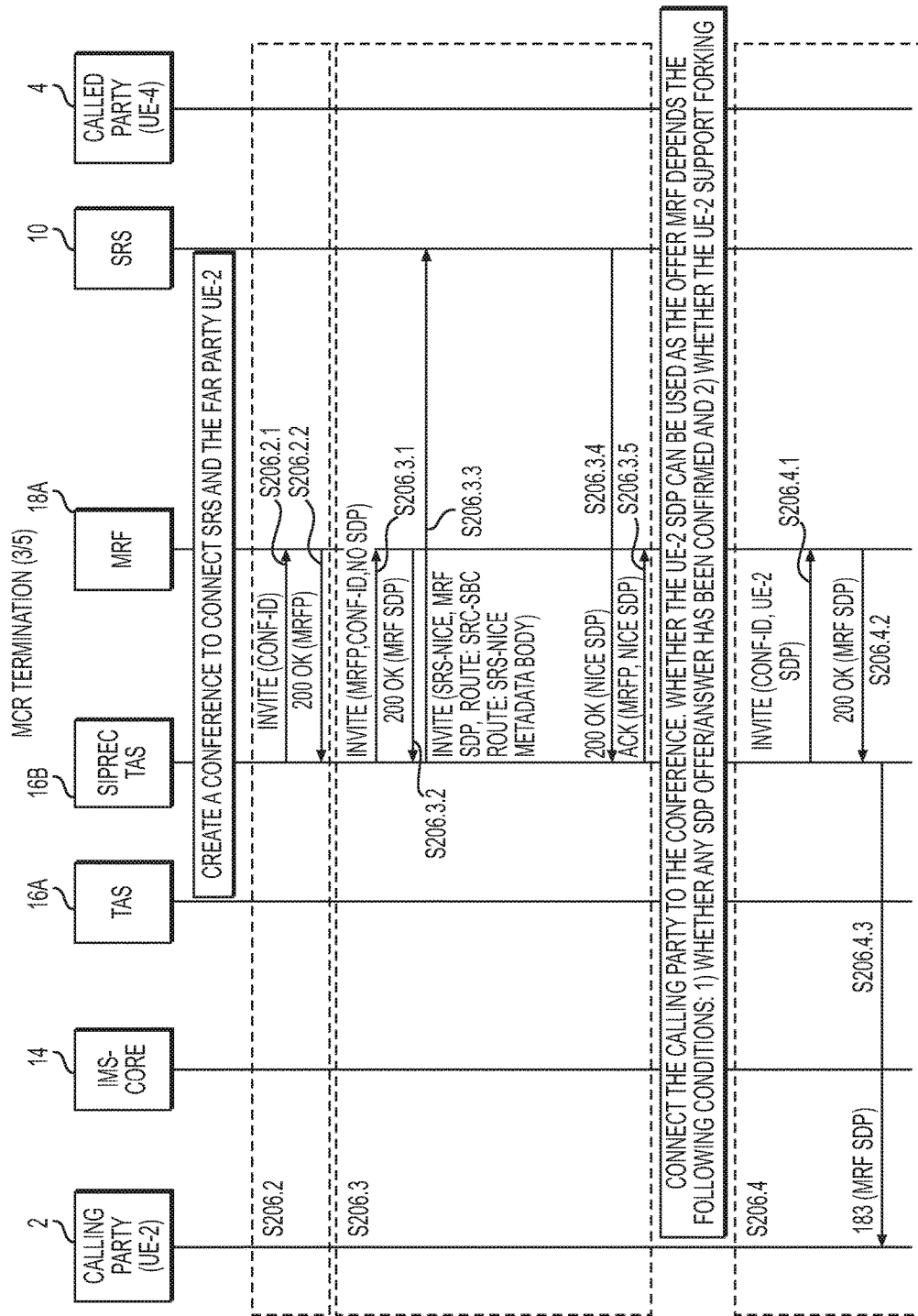
FIG. 14 illustrates another portion of a communication diagram for the MCR termination between the two parties, in accordance with an example embodiment.
Figure 15:
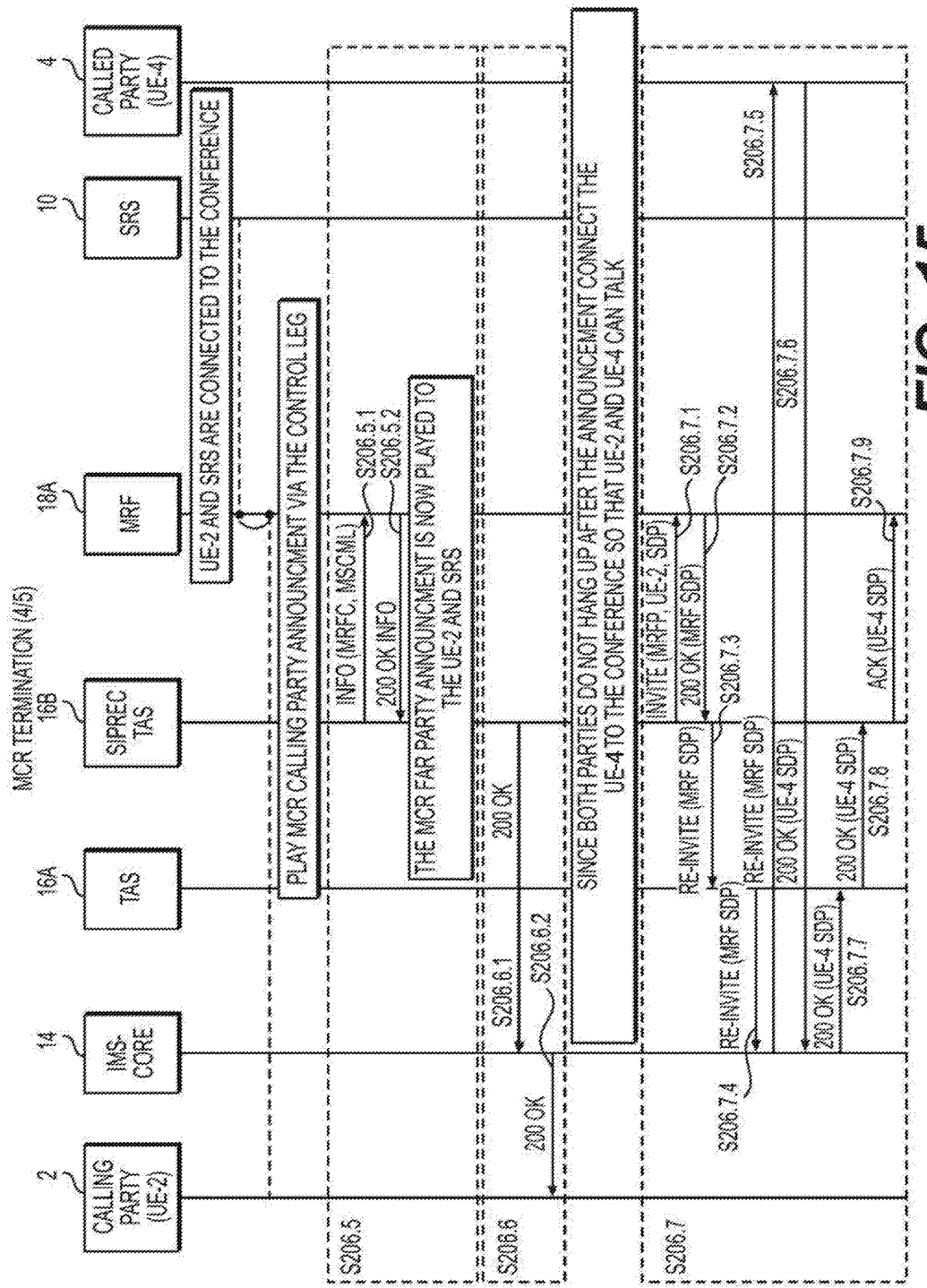
FIG. 15 illustrates another portion of a communication diagram for the MCR termination between the two parties, in accordance with an example embodiment.
Figure 16:
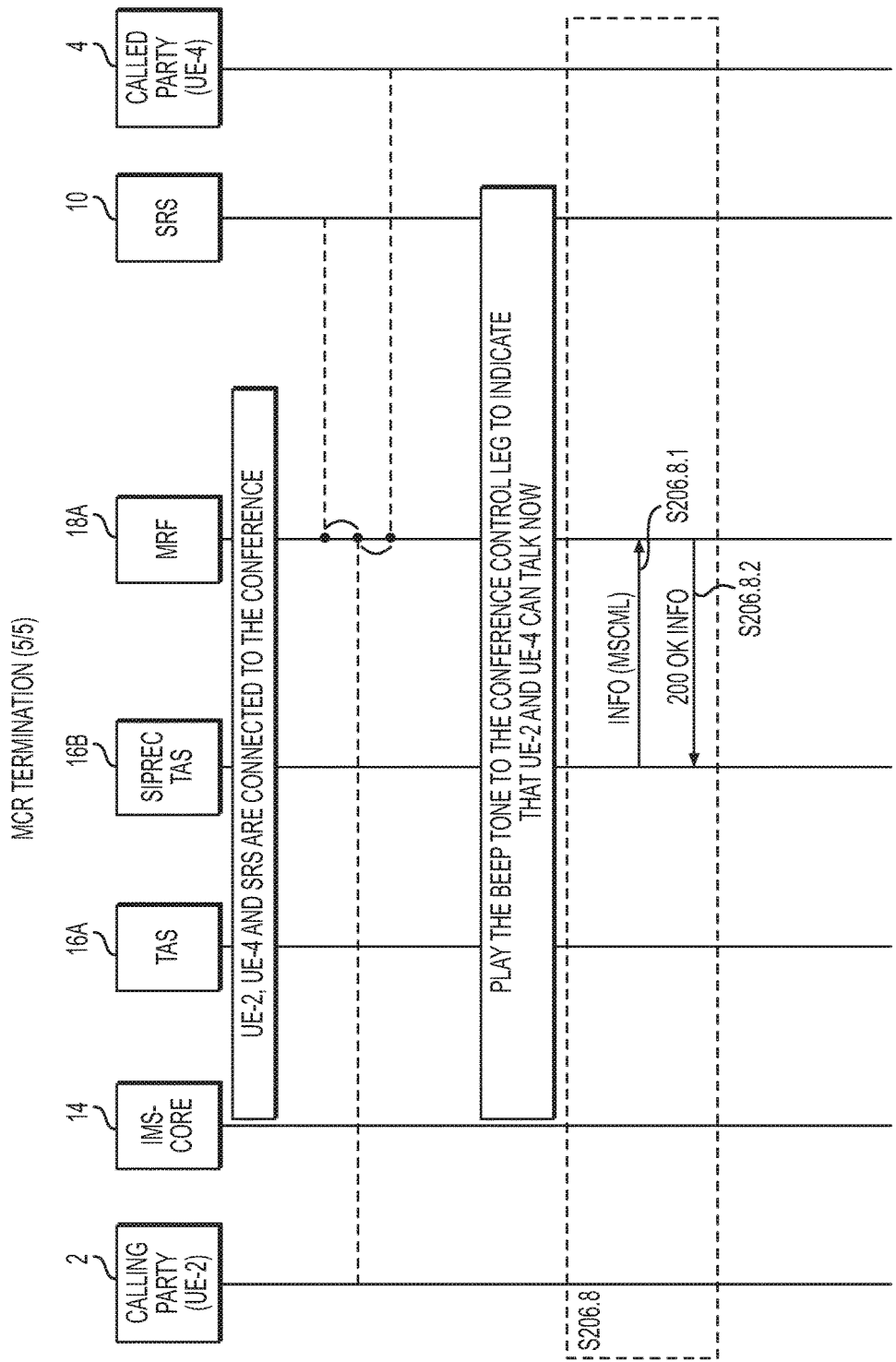
FIG. 16 illustrates another portion of a communication diagram for the MCR termination between the two parties, in accordance with an example embodiment.

In step S204 of FIG. 11, the TAS 16a may receive an answer indication from UE 4 (via Network Interface 1630a), whereupon the processor 1610a of the TAS 16a may allow the answer indication to be sent to the SIPREC TAS 16b, as depicted in S204.1 and S204.2 in FIG. 13.

In step S206 of FIG. 11, the SIPREC TAS 16b may receive an answer indication from the TAS 16a (via the Network Interface 1630b), whereupon the processor 1610b of the SIPREC TAS 16b may perform a number of tasks, described below.

Upon receipt of the answer indication from the called party 4, the processor 1610b may cause the SIPREC TAS 16b to play an MCR announcement to called party 4. This information exchange is shown in step S206.1.1 of FIG. 13, where the processor 1610b may cause the SIPREC TAS 16b to send an INVITE to the MRF 18a, and in step S206.1.2 of FIG. 13 the SIPREC TAS 16b may receive a 200 OK response (an acceptance response) from the MRF 18a indicating that an announcement resource has been reserved on the MRF 18a. In steps S206.1.3, the processor 1610b of the SIPREC TAS 16b may send a REINVITE from the SIPREC TAS 16b to the TAS 16a. In steps S206.1.4 and S206.1.5, the processor 1610a may cause the TAS 16a to send a REINVITE from the TAS 16a through the IMS core 14 to the called party 4. In steps S206.1.6 and S206.1.7, a 200 OK response may be sent from the called party 4 through the IMS core 14 to the TAS 16b. In step S206.1.8, the processor 1610a may cause the TAS 16a to send a REINVITE from the TAS 16a to the SIPREC TAS 16b. In step S206.1.9, the processor 1610b may cause the SIPREC TAS 16b to send an ACK from the SIPREC TAS 16b to the MRF 18a, which may establish a media connection between the MRF 18a, where the called party 4 and the called party 4 may hear the MCR announcement.

In step S206.2, the processor 1610b may cause the SIPREC TAS 16b to create a conference bridge by sending an invite for a conference to MRF 18a. This communication exchange is shown in step S206.2.1 of FIG. 14, where the processor 1610b may cause the SIPREC TAS 16b to send an INVITE to the MRF 18a, and in step S206.2.2 of FIG. 14 the SIPREC TAS 16b may receive a 200 OK response from the MRF 18a indicating that the conference has been successfully created.

In step S2106.3, the processor 1610b may cause the SIPREC TAS 16b to connect the SRS 10 to the conference MRF 18a. This information exchange is depicted in step S206.3.1 of FIG. 14, where the processor 1610b may cause SIPREC TAS 16b to send an INVITE to the MRF 18a to allocate a port on the conference bridge, and in step S206.3.2 the MRF 18a may send a 200 OK response with an SDP offer. In step S206.3.3, the processor 1610*b* may cause the SIPREC TAS 16*b* to send an INVITE (i.e., a SRS INVITE) with the SDP offer to the SRS 10. In step S206.3.4, the SRS 10 may send a 200 OK response with SDP answer to the SIPREC TAS 16*b*. In step S206.3.5, the processor 1610*b* may cause the SIPREC TAS 16*b* to send an ACK with SDP answer to the MRF 18*a*. At the conclusion of step S206.3.5, a media path may be established between the MRF 18*a* and the SRS 10.

In step S206.4, the processor 1610*b* may cause the SIPREC TAS 16*b* to connect the UE 2 to the conference MRF 18*a*. This communication exchange is shown in step S206.4.1 of FIG. 14, where the processor 1610*b* may cause the SIPREC TAS 16*b* to send an INVITE to the MRF 18*a* to allocate a port on the conference bridge, and in step S206.4.2 the MRF 18*a* may send a 200 OK response with an SDP offer. In step S206.4.3, a 183 Session Progress response may be sent from the SIPREC TAS 16*b* to the UE 2 to establish a media path between the calling party 2 and the MRF 18*a*.

In step S206.5, the processor 1610*b* may cause the SIPREC TAS 16*b* to instruct the MRF 18*a* to play a calling party MCR announcement for the UE 2. This communication exchange is depicted in step S206.5.1 of FIG. 15, where the processor 1610*b* may cause the SIPREC TAS 16*b* to send an INFO request to the MRF 18*a*. The INFO may include a request to play an MCR announcement on the conference bridge, so that the UE 2 may hear the announcement.

In step S206.6, the processor 1610*b* may cause the SIPREC TAS 16*b* to determine if either the UE 2 or the UE 4 has disconnected the call prior to the announcement being played in completion, and if the call has not been disconnected on either end then the processor 1610*b* may cause the SIPREC TAS 16*b* to send an answer indication to the calling party 2. In step S206.6.1, the processor 1610*b* may cause the SIPREC TAS 16*b* to send a 200 OK through the IMS core 14 to the calling party 2 to indicate that the call has been answered.

In step S206.7, the processor 1610*b* may cause the SIPREC TAS 16*b* to connect the UE 4 to the MRF 18*a*. This information exchange is depicted in step S206.7.1 of FIG. 15, where the processor 1610*b* may cause the SIPREC TAS 16*b* to send an INVITE to the MRF 18*a* to allocate a port on the conference bridge, and in step S206.7.2 the MRF 18*a* may send a 200 OK response with an SDP offer. In step S206.7.3 the processor 1610*b* may cause the SIPREC TAS 16*b* to send a REINVITE request with SDP offer to the TAS 16*a*, and in steps S206.7.4 and S206.7.5 the 200 OK response may be sent through the IMS core 14 to the UE 4. In steps S206.7.6 and S206.7.7, a 200 OK response with SDP answer may be sent from the UE 4 through the IMS core 14 to the TAS 16*a*. In step S206.7.8, the processor 1610*a* may cause the TAS 16*a* to send 200 OK response from the TAS 16*a* to SIPREC TAS 16*b*. In step S206.7.9, an ACK with SDP answer may be sent from the SIPREC TAS 16*b* to the MRF 18*b*. At the conclusion of step S206.6.9, a media path may be established between the MRF 18*a* and the UE 4, and now the UE 2, the UE 4, and the SRS 10 may all be connected to the same conference bridge on the MRF 18*a*.

In step S206.8, the processor 1610*b* may cause the SIPREC TAS 16*b* to instruct the MRF 18*a* to inject a beep tone into the conference bridge. This information exchange is shown in step S206.8.1 of FIG. 16, where the processor 1610*b* may cause the SIPREC TAS 16*b* to send an INFO request to the MRF 18*a*. The INFO may include a request to inject a beep tone into the conference, so that the UE 2 and the UE 4 may understand that the call has been fully established. In step S206.8.2, the MRF 18*a* may send a 200 OK response to the SIPREC TAS 18*b*. The UE 2 and the UE 4 may then begin two-way communication that may recorded by the SRS 10.

Services Provided by MCR:

Some of the 'managed call recording' (MCR) services provided by the example embodiments may include the following.

Call Forwarding:

In a call forwarding scenario, the SIPREC STAS may handle the MCR as a call termination. There is no need to create another SIPREC STAS for the forwarding leg in the example embodiments.

Call Transfer:

No special logic is needed in the example embodiments, as the SIPREC may be invoked at the network side. Although a call may be transferred to another party, the SIPREC (at the network side) may remain in the signaling path. In a successful call transfer scenario (accomplished by the MCR subscriber), there are two recording sessions.

Conference Calls:

If the MCR subscriber is the conference controller, each connection between the controller and the participant may be recorded in one session. For a 6-way call, there may be 5 recording sessions.

Call Waiting:

A call waiting call may be handled as a normal call.

411 Calls:

If an MCR subscriber makes a 411 call (i.e. directory assistance call type), the CTS may apply the originating MCR service logic. However, when the 411 operator answers the call, no recording announcement may be played to the 411 operator.

Operator Calls:

If an MCR subscriber makes an operator call (i.e. operator local, operator long distance, operator international, or international operator assist), the CTS may apply the originating MCR logic as a normal call. However, when the operator answers the call, no recording announcement will be played to the operator.

Emergency Calls:

If an MCR subscriber makes an emergency call (i.e. all emergency types), the CTS shall not apply the MCR service logic.

Voice Mail Deposit and Retrieval:

In the example embodiments, the MCR call recording may be continued. However, no announcement will be played to the voice mail system.

Call Park:

When an MCR subscriber parks a call, the recording may be continued in the example embodiments.

Call Retrieve:

No special requirement may be needed in the example embodiments if the retrieving party is an MCR subscriber, as the call may be handled as a normal call origination. If the park party is an MCR subscriber, the invoked SIPREC STAS may remain.

Call Pickup:

When an MCR subscriber picks up a call, the MCR service may be invoked as a call origination.

Call Barge-In:

The MCR service may be invoked as a call origination, when an MCR subscriber barges into a call.

Auto Attendant:

A call terminated to an auto attendant may be treated as a normal termination.

SCAP (Shared Call Appearance) Hold Using In-Dialog Refer:

The SIPREC may be continued (as the SIPREC interface is at the network side), although the UE may be released from the call.

SCAP (Shared Call Appearance) Retrieve Using INVITE with a Replace Header:

No special requirement may be needed in the example embodiments, as SIPREC interface may be at the network side. The SIPREC STAS serving the SCAP server may not be impacted.

SCAP (Shared Call Appearance) Bridge Using INVITE with a Join Header:

No special requirement may be needed, as SIPREC interface may be at the network side. The SIPREC STAS 16b serving the SCAP server will not be impacted.

Busy Lamp Field:

When the monitored party (with the MCR service assigned) makes a phone call, the call may be handled in the same way as a basic call origination. When the monitoring party (with the MCR service assigned) pickups the call, the call may be handled in the same way as a regular call pickup.

Shared Call Appearances:

For call termination, the fan-out requirement may be followed. The call may be recorded at the network side and no special MCR logic may be needed. For call origination, the TAS 16a serving the SCAP PUID (Shared Call Appearances Public User Identity) may behave in a same manner as a call initiated from a regular PUID and the SIPREC STAS 16b may be invoked after the TAS 16a.

Intercom Calls:

Because Intercom calls are intra group calls, the MCR service may not be applicable for intercom calls.

Visitor Desk Phone (VDP):

For call termination, the procedure may be similar to call forwarding. The call may be recorded at the network side and no special MCR logic may be needed. For call origination, the TAS 16a serving a VDP subscriber PUID behaves in a same manner as a call initiated from a regular PUID and the SIPREC STAS 16b may be invoked after the TAS 16a.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of supporting managed call recording (MCR) services for a call between a calling party and a called party, comprising:
    receiving, by at least one first processor controlling at least one first network node, an invite message from the calling party, the invite message being a session initiation protocol (SIP) protocol message including a header identifying the called party;
    identifying, by the at least one first processor, that at least one of the calling party and the called party is a MCR subscriber;
    creating, by the at least one processor, a conference bridge for the calling party, the called party, and a SIP recording server (SRS) once the call has been answered by the called party, if at least one of the calling party and the called party is a MCR subscriber, the at least one first processor being configured to create the conference bridge even if only one of the calling party and the called party is the MCR subscriber;
    transmitting, by the at least one processor, instructions to play MCR announcements using the conference bridge; and
    connecting, by the at least one processor, the call between the calling party and the called party that is recorded by the SRS,
    wherein the creating of the conference bridge includes,
        modifying the header of the invite message in order to re-direct the invite message to a session initiation protocol recording telephony application server (SIPREC TAS),
        transmitting a re-invite message to the called party,
        transmitting a SRS invite message to the SRS,
        receiving an acceptance message from the called party and the SRS, and
        transmitting a conference invite message to a conference media resource function (MRF) in order to command the MRF to create the conference bridge.

2. The method of claim 1, wherein the creating of the conference bridge further includes,
    connecting the calling party to the conference MRF,
    connecting the called party to the conference MRF, and
    connecting a service recording server (SRS) to the conference MRF.

3. The method of claim 2, wherein the connecting of the call between the calling party and the called party includes the following, if the calling party is the MCR subscriber,
    connecting the calling party to the conference MRF, if neither of the calling party and the called party has disconnected from the conference MRF prior to the respective called party and calling party MCR announcements being played in completion, and
    injecting a beep tone into the conference bridge prior to connecting the call.

4. The method of claim 2, wherein the connecting of the call between the calling party and the called party includes the following, if the called party is the MCR subscriber,
    connecting the called party to the conference MRF,
    sending an answer message to the calling party, if neither of the calling party and the called party has disconnected from the conference MRF prior to the respective called party and calling party MCR announcements being played in completion, and
    injecting a beep tone into the conference bridge prior to connecting the call.

5. The method of claim 1, wherein the transmitting of the instructions to play the MCR announcements includes,
    if the calling party is the MCR subscriber,
        transmitting first instructions to the MRF to command the MRF to play a called party MCR announcement for the called party,
        transmitting second instructions to the MRF to command the MRF to play a calling party MCR announcement for the calling party,
    if the called party is the MCR subscriber,
        transmitting third instructions to the MRF to command the MRF to play a calling party MCR announcement for the calling party,
        transmitting fourth instructions to the MRF to command the MRF to play a called party MCR announcement for the called party.

6. The method of claim 1, wherein the creating, transmitting, and connecting steps are performed by a session initiation protocol recording telephony application server (SIPREC TAS), the SIPREC TAS being different that the at least one first network node.

7. At least a first network node, comprising:
at least one first processor configured to,
receive an invite message from a calling party, the invite message being a session initiation protocol (SIP) protocol message including a header identifying a called party for a call;
identify that at least one of the calling party and the called party is a MCR subscriber;
create a conference bridge for the calling party, the called party, and a SIP recording server (SRS) once the call has been answered by the called party, if at least one of the calling party and the called party is a MCR subscriber, the at least one first processor being configured to create the conference bridge even if only one of the calling party and the called party is the MCR subscriber;
transmit instructions to play MCR announcements using the conference bridge; and
connect the call between the calling party and the called party that is recorded by the SRS,
wherein the least one first processor creates the conference bridge by being further configured to,
modify the header of the invite message in order to re-direct the invite message to a session initiation protocol recording telephony application server (SIPREC TAS),
transmit a re-invite message to the called party,
transmit a SRS invite message to the SRS,
receive an acceptance message from the called party and the SRS, and
transmit a conference invite message to a conference media resource function (MRF) in order to command the MRF to create the conference bridge.

8. The at least a first network node of claim 7, wherein the at least one first processor creates the conference bridge by being further configured to,
connect the calling party to the conference MRF,
connect the called party to the conference MRF, and
connect a service recording server (SRS) to the conference MRF.

9. The at least a first network node of claim 8, wherein the at least one first processor connects the call between the calling party and the called party by being further configured to perform the following steps, if the calling party is the MCR subscriber,
connect the calling party to the conference MRF, if neither of the calling party and the called party has disconnected from the conference MRF prior to the respective called party and calling party MCR announcements being played in completion, and
inject a beep tone into the conference bridge prior to connecting the call.

10. The at least a first network node of claim 8, wherein the at least one first processor connects the call between the calling party and the called party by being further configured to perform the following steps, if the called party is the MCR subscriber,
connect the called party to the conference MRF,
send an answer message to the calling party, if neither of the calling party and the called party has disconnected from the conference MRF prior to the respective called party and calling party MCR announcements being played in completion, and
inject a beep tone into the conference bridge prior to connecting the call.

11. The at least a first network node of claim 7, wherein the at least one first processor transmits the instructions to play the MCR announcements by being further configured to,
if the calling party is the MCR subscriber,
transmitting first instructions to the MRF to command the MRF to play a called party MCR announcement for the called party,
transmitting second instructions to the MRF to command the MRF to play a calling party MCR announcement for the calling party,
if the called party is the MCR subscriber,
transmitting third instructions to the MRF to command the MRF to play a calling party MCR announcement for the calling party,
transmitting fourth instructions to the MRF to command the MRF to play a called party MCR announcement for the called party.

12. The at least a first network node of claim 7, wherein the creating, transmitting, and connecting steps are performed by a session initiation protocol recording telephony application server (SIPREC TAS), the SIPREC TAS being different that the at least one first network node.

* * * * *